(12) United States Patent
Xu et al.

(10) Patent No.: US 11,726,497 B2
(45) Date of Patent: Aug. 15, 2023

(54) CONTROL METHOD FOR CLEANING SYSTEM

(71) Applicant: SUZHOU RADIANT PHOTOVOLTAIC TECHNOLOGY CO., LTD., Jiangsu (CN)

(72) Inventors: Jianrong Xu, Suzhou (CN); Jianxiang Lu, Suzhou (CN); Fei Xu, Suzhou (CN)

(73) Assignee: SUZHOU RADIANT PHOTOVOLTAIC TECHNOLOGY CO., LTD., Jiangsu (CN)

( * ) Notice: Subject to any disclaimer, the term of this patent is extended or adjusted under 35 U.S.C. 154(b) by 205 days.

(21) Appl. No.: 17/277,392

(22) PCT Filed: Nov. 9, 2019

(86) PCT No.: PCT/CN2019/116915
§ 371 (c)(1),
(2) Date: Mar. 18, 2021

(87) PCT Pub. No.: WO2020/094146
PCT Pub. Date: May 14, 2020

(65) Prior Publication Data
US 2022/0035379 A1  Feb. 3, 2022

(30) Foreign Application Priority Data
Nov. 9, 2018  (CN) .......................... 201811334485.2

(51) Int. Cl.
*G05D 1/02* (2020.01)
*H02S 40/10* (2014.01)
(Continued)

(52) U.S. Cl.
CPC ............ *G05D 1/0287* (2013.01); *B60P 3/062* (2013.01); *G05B 6/02* (2013.01); *G05D 1/027* (2013.01);
(Continued)

(58) Field of Classification Search
CPC .... G05D 1/0088; G05D 1/0257; G05D 1/028; G05D 1/0285; G05D 2201/0213; G01W 1/00
See application file for complete search history.

(56) References Cited

U.S. PATENT DOCUMENTS 9,493,184 B2 * 11/2016 Castaneda ............ G05D 1/0255
2006/0069472 A1 * 3/2006 Makela ................. B60W 40/00
701/532
(Continued)

FOREIGN PATENT DOCUMENTS

CN   104467646 A   3/2015
CN   105783915 A   7/2016
(Continued)

OTHER PUBLICATIONS

English Machine Translation of FR-3022360-A1, accessed Jan. 25, 2023.*

*Primary Examiner* — Jeff A Burke
*Assistant Examiner* — Blake A Wood
(74) *Attorney, Agent, or Firm* — Mark M. Friedman

(57) ABSTRACT

A control method for a cleaning system, comprising the following steps: first control step—controlling a transfer robot to move a cleaning robot to a cleaning area; cleaning control step—controlling the cleaning robot to perform a cleaning operation on a upper surface of the cleaning area; second control step—controlling a transfer robot to move the cleaning robot away from the cleaning area.

12 Claims, 12 Drawing Sheets

(51) Int. Cl.
  *B60P 3/06* (2006.01)
  *G05B 6/02* (2006.01)
(52) U.S. Cl.
  CPC ........... *G05D 1/0225* (2013.01); *H02S 40/10* (2014.12); *G05D 1/0231* (2013.01); *G05D 2201/0203* (2013.01)

(56) References Cited

U.S. PATENT DOCUMENTS

| | | | | |
|---|---|---|---|---|
| 2011/0137458 | A1* | 6/2011 | Hisatani | B08B 3/024 |
| | | | | 901/1 |
| 2016/0375901 | A1* | 12/2016 | Di Cairano | G01C 21/34 |
| | | | | 701/26 |
| 2018/0241343 | A1* | 8/2018 | Jiang | B08B 1/002 |
| 2019/0158017 | A1 | 5/2019 | Hu | |

FOREIGN PATENT DOCUMENTS

| | | | | |
|---|---|---|---|---|
| CN | 106938269 A | 7/2017 | | |
| CN | 107052012 A | 8/2017 | | |
| CN | 206575373 U | 10/2017 | | |
| CN | 107544519 A | 1/2018 | | |
| CN | 107621825 A | 1/2018 | | |
| CN | 109361352 A | 2/2019 | | |
| CN | 109560767 A | 4/2019 | | |
| FR | 3022360 A1 * | 12/2015 | ............. | B08B 1/008 |
| KR | 101034192 B1 | 5/2011 | | |
| KR | 20180134710 A | 12/2018 | | |

\* cited by examiner

CONTROL METHOD FOR CLEANING SYSTEM

FIELD OF INVENTION

The present invention relates to a cleaning system and a cleaning method of cleaning solar panels.

BACKGROUND OF INVENTION

Under a circumstance that fossil fuels are declining, solar energy, as a new renewable energy source, has become an important part of mankind's energy use. In the past ten years, solar energy application technologies have been rapidly developed in countries around the world.

Since a working environment of solar panels can only be outdoors, a biggest problem that affects their work is not wind, rain, thunder, and lightning, but dust and snow accumulated all year round. Dust or other attachments attached to the solar panels will affect a light transmittance of the panels and hinder photoelectric efficiency, which will seriously affect efficiency of the panels to directly obtain sunlight, thereby reducing energy absorption and conversion efficiency of the panels, and reducing power generation efficiency.

Therefore, each photovoltaic power station needs to clean surfaces of the solar panels. It is obvious that manual cleaning is inefficient and risky. Correspondingly, the industry has developed a solar panel cleaning robot to clean the surfaces of the solar panels, which can effectively improve a cleaning efficiency without potential personal safety hazards associated with high-rise cleaning operations.

TECHNICAL PROBLEM

Since a placement of solar panels or panel arrays is not set in a block, but in multiple locations in a certain region, there is a large space between solar panels or panel arrays at different positions in the region. Cleaning robots cannot directly span these space intervals on different solar panels. If a cleaning robot is installed on each of the solar panels, not only is a hardware cost too high, but usage efficiency of each of the cleaning robot is too low, which will result in greater waste of resources.

SUMMARY OF INVENTION

Technical Solutions

Based on the above problems, we need to invent an intelligent cleaning system, including a cleaning device, a shuttling device, and a data processing system. The cleaning device can complete effective cleaning on a single solar panel or panel array. The shuttling device can transfer the cleaning robot from one solar panel array to another solar panel array. The data processing system can remotely dispatch and control the cleaning robot to efficiently complete a cleaning work on different panel arrays.

An object of the present invention is to provide a control method of a cleaning system to solve a technical problem that a large number of solar panels and panel arrays need to be cleaned.

In order to achieve the above objective, the present invention provides the control method of the cleaning system, including following steps: a first control step, controlling a shuttling robot to carry a cleaning robot to a cleaning region; a cleaning control step, controlling the cleaning robot to perform a cleaning operation on an upper surface of the cleaning region; and a second control step, controlling the shuttling robot to carry the cleaning robot out of the cleaning region.

Furthermore, before the first control step, the control method further includes: an information acquisition step, acquiring an operation region information and an operation task information; and a step of calculating a number of robots, calculating a number of the cleaning robots and a number of the shuttling robots that need to be dispatched; wherein the operation region information includes a map of an operation region, the operation region includes all of the cleaning regions and a passage region between two or more of the cleaning regions, at least one positioning point is set in the passage region, at least one identifiable label is set at each of the positioning point, and each of the positioning point is set with at least one identifiable label storing a position and a serial number of the positioning point; the operation region information further includes a serial number, a size, and a position of each of the cleaning region in the operation region, and the position and the serial number of the at least one positioning point in the operation region; and the operation task information includes the serial number of the cleaning region that needs to be cleaned and an operation time range allowed to perform the cleaning operation.

Furthermore, the step of calculating the number of the robots includes following steps: a speed acquisition step, acquiring a traveling speed of the cleaning robot and a traveling speed of the shuttling robot; a total working-hours calculation step, calculating a working-hours required to complete a cleaning task in each of the cleaning region according to the size of the cleaning region need to be cleaned and the traveling speed of the cleaning robot; a step of calculating the number of the cleaning robots, calculating the number M of the cleaning robots that need to be dispatched according to a total number of the cleaning regions that need to be cleaned, the working-hours required to complete the cleaning task in each of the cleaning region, and the operation time range; a distance calculation step, calculating a total distance that the shuttling robot needs to travel according to the position of the cleaning region that needs to be cleaned; and a step of calculating the number of the shuttling robots, calculating the number N of the shuttling robots need to be dispatched according to the total distance and the traveling speed of the shuttling robots.

Furthermore, the first control step or the second control step further includes: a step of controlling a travel of the shuttling robot, controlling the shuttling robot to travel to a first shuttling region of the cleaning region, wherein the step of controlling the travel of the shuttling robot includes following steps: a first instruction launching step, launching a first command to at least one of the shuttling robots, wherein the first command includes the serial number of the shuttling robot and a recommended route of the shuttling robot, and further includes an information of the at least one positioning point positioned on the recommended route and a preset travel direction corresponding to each of the positioning point; a travel data acquisition step, when the shuttling robot travels to any of the positioning point, acquiring the information of the positioning point and a real-time travel direction of the shuttling robot; a position comparison step, determining whether the positioning point is in the recommended route or not, if not, returning to the first instruction launching step, if yes, executing a next step; a direction comparison step, determining whether an actual travel direction of the shuttling robot at the positioning point is consistent with the preset travel direction corresponding to the positioning point or not, if not, determining that the shuttling robot is in a wrong direction, and executing the next step; and a second instruction launching step, launching a second command to the shuttling robot going the wrong direction, and adjusting the travel direction of the shuttling robot to the preset travel direction corresponding to the positioning point according to the recommended route.

Furthermore, the control method of the cleaning system further including following steps: a passage region setting step, setting up two or more of the passage regions to form a passage network for at least one of the robots to travel; a positioning point setting step, setting at least one of positioning points in the passage network uniformly; and a label setting step, setting at least one identifiable label at each of the positioning points, wherein the identifiable label stores an information of the positioning point including a position and a serial number of the positioning point of the identifiable label.

Furthermore, the control method of the cleaning system further including following steps: an electronic compass setting step, setting an electronic compass in each of the shuttling robot to obtain a real-time travel direction of the shuttling robot.

Furthermore, the first control step includes following steps: a travel control step of the shuttling robot, controlling the shuttling robot loaded with the cleaning robot to travel to a first shuttling region of the cleaning region, wherein the first shuttling region is a region outside the cleaning region and next to a side of the cleaning region; a docking control step, after acquiring an in-position signal of the shuttling robot, controlling the shuttling robot to dock with the cleaning region; and a transfer control step of the cleaning robot, after acquiring a docking completion signal, controlling the cleaning robot to travel to the cleaning region, and sending a transfer completion signal.

Furthermore, the second control step includes following steps: a travel control step of the shuttling robot, controlling an unloaded shuttling robot to travel to a first shuttling region of the cleaning region, wherein the first shuttling region is a region outside the cleaning region and next to a side of the cleaning region; a docking control step, after acquiring an in-position signal of the shuttling robot, controlling the shuttling robot to dock with the cleaning region; and a transfer control step of the cleaning robot, after acquiring an in-position signal of the cleaning robot, controlling the cleaning robot to travel from the cleaning region to a shuttling platform of the shuttling robot, and sending a transfer completion signal.

Furthermore, the control method of the cleaning system before the docking control step, the control method further includes: an initial adjustment control step of the shuttling robot, controlling the shuttling robot to adjust a height and an inclination angle of the shuttling platform and to adjust a position of the shuttling robot; and wherein the initial adjustment control step of the shuttling robot further includes: an initial adjustment control step of the shuttling platform, controlling the shuttling robot to adjust an angle and a height of the shuttling platform so that an upper surface of the shuttling platform and an upper surface of the cleaning region positioned on a same plane; and/or, a direction adjustment control step of the shuttling platform, controlling the shuttling robot to adjust a direction of an access opening of the shuttling platform so that the access opening of the shuttling platform faces the cleaning region; and/or, a distance adjustment control step, controlling the shuttling robot to adjust a distance between the shuttling platform and a border of the cleaning region so that the distance between the shuttling platform and the border of the cleaning region being less than a preset threshold; wherein when the upper surface of the shuttling platform and the upper surface of the cleaning region are on the same plane, the access opening of the shuttling platform faces the cleaning region, and the distance between the shuttling platform and the border of the cleaning region is less than the preset threshold, the shuttling robot sends a shuttling robot in-position signal.

Furthermore, after the transfer control step of the cleaning robot, the control method further includes following steps: an undocking control step, after acquiring the transfer completion signal, controlling the shuttling robot to undock so that the upper surface of the shuttling platform leaves from the upper surface of the cleaning region; a re-adjustment control step of the shuttling platform, controlling the shuttling robot to adjust the height and the angle of the shuttling platform, so that the height of the shuttling platform is lower to a lowest point and the shuttling platform remains in a horizontal state; and a departing control step of the shuttling robot, controlling the shuttling robot to leave the cleaning region.

Furthermore, the docking control step further includes controlling the shuttling robot to extend a bridge board to connect the upper surface of the shuttling platform with the upper surface of the cleaning region, and when the docking is completed, the shuttling robot sending the docking completion signal to a data processing system; and wherein the undocking control step further includes controlling the shuttling robot to retract the bridge board so that the upper surface of the shuttling platform separated from the upper surface of the cleaning region, and when the docking is completed, the shuttling robot sending the docking completion signal to the data processing system.

Furthermore, in the cleaning control step, after acquiring the transfer completion signal, the cleaning robot is controlled to perform cleaning operation on an upper surface of a solar panel.

Furthermore, before the docking control step, the second control step further includes following steps: a position detection control step of the cleaning robot, controlling the shuttling robot to determine whether the cleaning robot is positioned in a second shuttling region or not, if yes, the shuttling robot sending the in-position signal of the cleaning robot to a data processing system, if not, executing a next step; and a position adjustment control step of the cleaning robot, controlling the cleaning robot to adjust a position to the second shuttling region, and the shuttling robot or the cleaning robot sending the in-position signal of the cleaning robot to the data processing system.

Beneficial Effect

Compared with the conventional art, an advantage of the present invention is to provide a control method of a cleaning system to complete an intelligent cleaning work of a large number of solar panels, and dispatch an appropriate number of cleaning robots and shuttling robots according to a workload of the cleaning operation. The cleaning robot is configured to complete the cleaning work on the solar panels or solar panel array, and the shuttling robot is configured to transfer the cleaning robot between multiple solar panel arrays, which can complete a cleaning task of all the solar panels and panel arrays in a shortest time.

BRIEF DESCRIPTION OF FIGURES

In order to more clearly describe the technical solutions in the embodiments of the present invention, the following will briefly introduce the drawings needed in the description of the embodiments. Obviously, the drawings in the following description are only some of the present invention. Embodiments, for those skilled in the art, without creative work, other drawings can be acquired based on these drawings.

The components in the figures are identified as follows.

Figure 1:
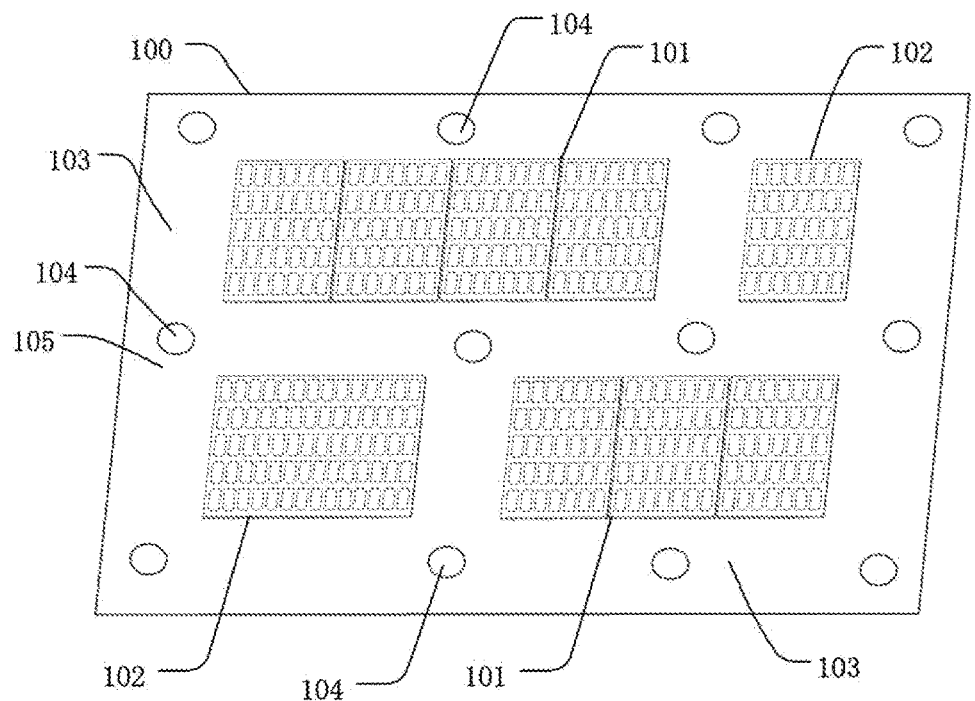
FIG. 1 is a schematic diagram of an operation region according to an embodiment of the present invention.

100 operation region, 200 cleaning robot, 300 shuttling robot, 400 data processing system, 500 cleaning region;

101 solar panel array, 102 solar panel, 103 passage region, 104 positioning point, 105 intersection;

201 first wireless communication unit, 301 second wireless communication unit, and 401 third wireless communication unit;

310 vehicle, 320 shuttling device, 330 angle adjustment device, 340 processor, 350 height adjustment device;

311 vehicle body, 312 traveling device, 313 vehicle bracket, 314 circuit board;

321 shuttling platform, 322 baffle, 322a left baffle, 322b rear baffle, 322c right baffle, 323 access opening;

324 anti-collision component, 325a, 325b sliding shaft base, 325c, 325d first sliding groove;

326a, 326b rotating shaft base, 326c, 326d base-through-hole, 327 bridge board, 328 first telescopic rod, 329 first telescopic rod controller; 331 sliding shaft, 332 second telescopic rod, 333 rotating shaft, 334 telescopic rod mounting frame, 335 second telescopic rod controller;

351 frame, 352 first bracket, 353 second bracket, 354 pin shaft; 355a, 355b first guide rail, 356a, 356b second guide rail, 357a, 357b second sliding groove, 358a, 358b third sliding groove;

359 third telescopic rod, 360 third telescopic rod controller;

501 upper end of cleaning region, 502 lower end of cleaning region, 503 left end of cleaning region, 504 right end of cleaning region;

505 first shuttling region, 506 second shuttling region;

601 through-beam sensor, 601a transmitter, 601b receiver; 602 distance sensor, 603 tilt sensor, 604 positioning device, 605 electronic compass; 606 image sensor, 607 lighting device, 608 obstacle avoidance sensor;

3521a, 3521b first link, 3522 first cross beam, 3523a, 3523b first pulley, 3524 sleeve;

3531a, 3531b second link, 3532 second cross beam, and 3533a, 3533b second pulley.

DETAILED DESCRIPTION OF EMBODIMENTS

The following describes the preferred embodiments of the present disclosure with reference to the accompanying drawings of the specification to exemplify that the present disclosure can be implemented. These embodiments can completely introduce the technical content of the present disclosure to those skilled in the art, making the technical content of the present disclosure clearer and easy to understand. However, the present disclosure can be embodied by many different forms of embodiments, and the scope of protection of the present disclosure is not limited to the embodiments mentioned in the text.

In the drawings, components with the same structure are represented by the same numerals, and components with similar structures or functions are represented by similar numerals. When a component is described as being "connected to" another component, the two can be understood as directly "connected", or one component is "connected" to the other component through an intermediate component.

As shown in FIG. 1, each of solar panel array 101 includes a plurality of solar panels 102 (referred to as panels) spliced together, and a plurality of solar panel arrays 101 and/or a plurality of solar panels 102 can be disposed in an array. A passage region 103 is formed between adjacent two of the solar panel arrays 101 or adjacent two of the solar panels 102. In the present embodiment, a plurality of passage regions 103 that are cross-connected to each other form a crisscross passage network.

Figure 2:
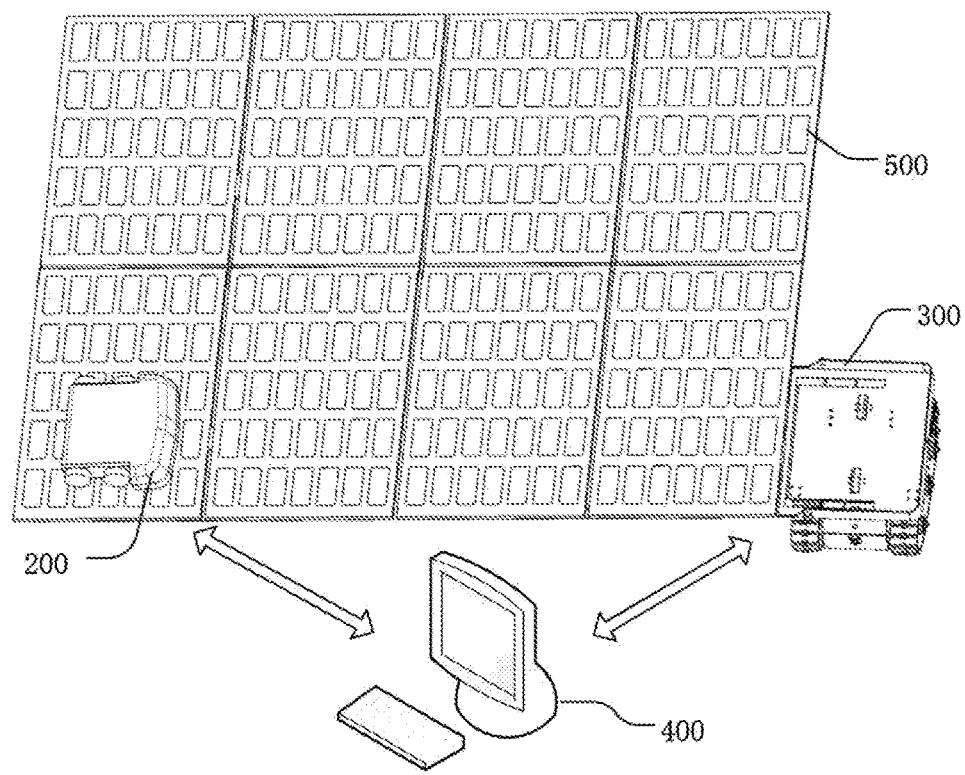
FIG. 2 is a schematic diagram of a working state of a cleaning system according to an embodiment of the present invention.
Figure 3:
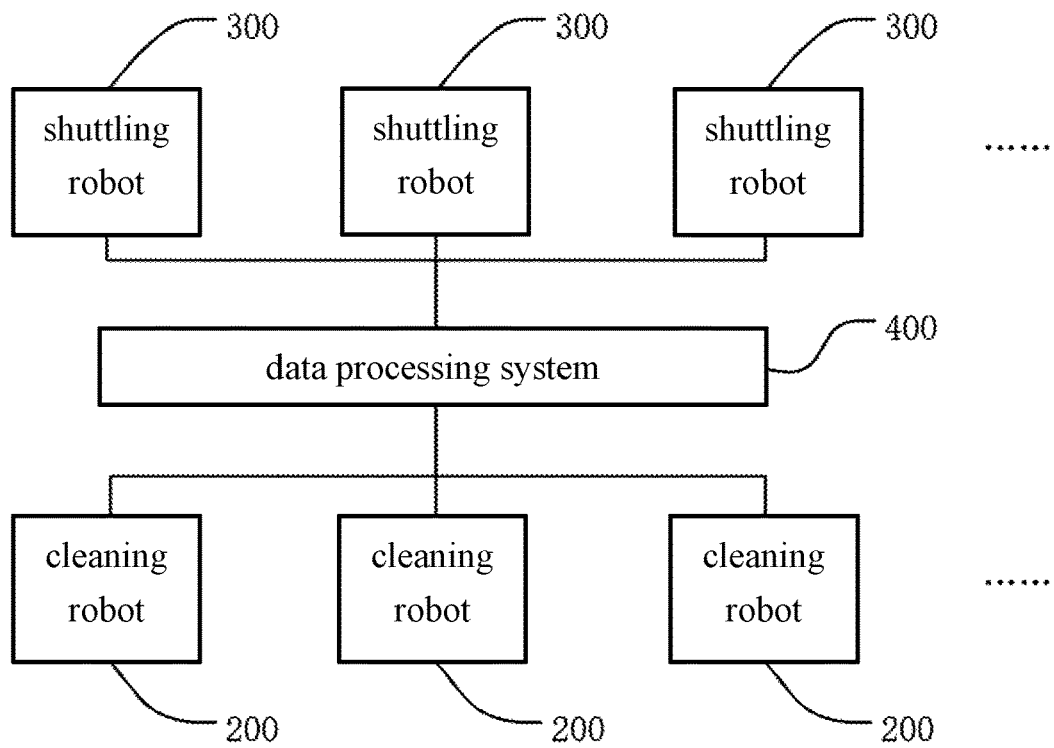
FIG. 3 is a schematic structural diagram of the cleaning system according to an embodiment of the present invention.

As shown in FIG. 2 and FIG. 3, the present embodiment provides a cleaning system, including a cleaning robot 200, a shuttling robot 300, and a data processing system 400. An operation region 100 is an operating region of the cleaning robot 200 and the shuttling robot 300 to complete cleaning operations of the solar panels.

During a normal operation of a solar power station, some solar panels or solar panel arrays will be contaminated with dust or stains and need to be cleaned. Each of the solar panel or each of the solar panel array that needs to be cleaned is a cleaning region 500. The cleaning robot 200 can complete cleaning operations on the solar panel or the solar panel array, and can effectively clean every region on the panel or the panel array. The shuttling robot 300 can carry the cleaning robot 200 from a storage place of the cleaning robot to an upper surface of the cleaning region 500 (panel or panel array that needs to be cleaned), from an upper surface of a cleaned panel array to another upper surface of the cleaning region 500 (panel or panel array that needs to be cleaned), or from a cleaned upper surface of the cleaning region 500 to the storage place of the cleaning robot.

Figure 4:
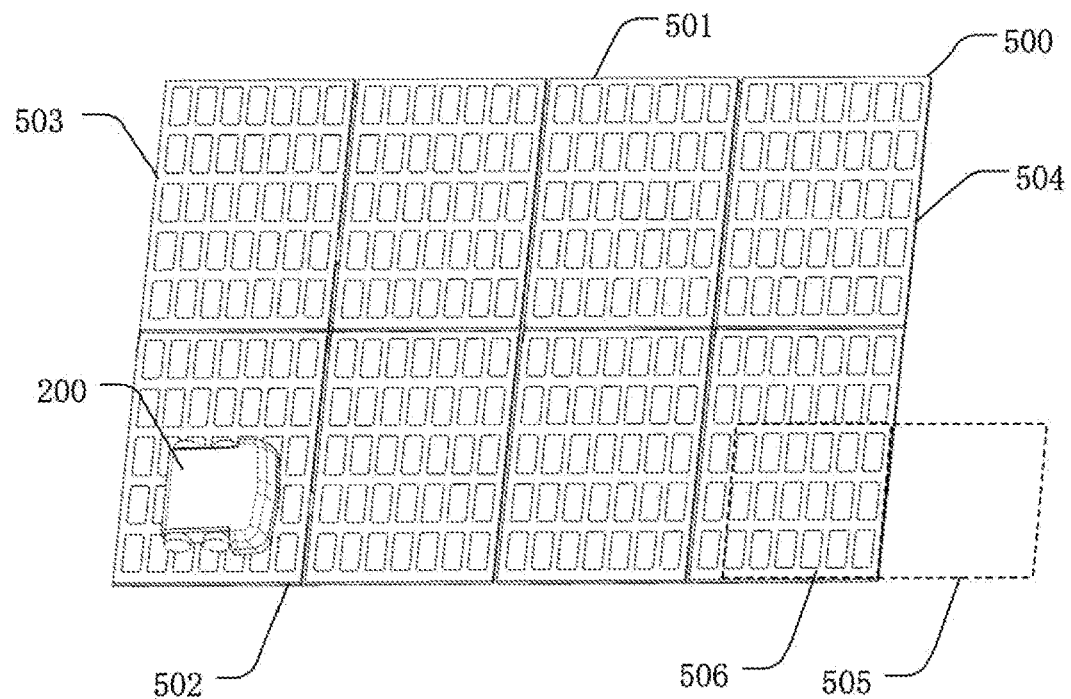
FIG. 4 is a schematic structural diagram of a cleaning region according to an embodiment of the present invention.

As shown in FIG. 4, preferably, each of the cleaning region 500 is a group of panel arrays to composite in rectangular, and its peripheral edges are respectively defined as an upper end 501 of the cleaning region, a lower end 502 of the cleaning region, a left end 503 of the cleaning region, and a right end 504 of the cleaning region.

When the cleaning robot 200 is carried by the shuttling robot 300 to the cleaning region 500, preferably, the cleaning robot 200 travels from the left end 503 of the cleaning region or the right end 504 of the cleaning region to the cleaning region 500. Similarly, specifically, when the cleaning robot 200 is transferred from the cleaning region 500 by the shuttling robot 300, preferably, the cleaning robot 200 travels from the left end 503 of the cleaning region or the right end 504 of the cleaning region to the shuttling robot 300.

As shown in FIG. 4, each of the cleaning region 500 is provided with a first shuttling region 505 and a second shuttling region 506 that are arranged opposite to each other, and the first shuttling region 505 and the second shuttling region 506 are respectively provided at both sides of the left end 503 of the cleaning region or the right end 504 of the cleaning region. In the present embodiment, the first shuttling region 505 is a region outside the cleaning region 500 that is adjacent to the right end 504 of the cleaning region, and the second shuttling region 506 is a region inside the cleaning region that is adjacent to the right end 504 of the cleaning region. Preferably, the first shuttling region 505 and the second shuttling region 506 are adjacent to a lower part of the right end 504 of the cleaning region.

To determine whether the solar panel arrays in the photovoltaic power station need to be cleaned, there are several common solutions as follows. First is a partition estimation method. A natural environment of multiple panel arrays adjacent to each other in a small region (region can be freely defined) is similar, so a degree of pollution of the panels in this region is similar. Randomly select a solar panel, detecting its pollution level, and determine whether the panel needs to be cleaned or not; if the panel needs to be cleaned, all the panels in the region need to be cleaned. If the operation region of a power station covers a large region, a large operation region can be divided into multiple small operation regions, and a sampling inspection can be carried out in different regions. Second is a regular cleaning method. According to the natural environment of the operation region, all the panel arrays in the operation region are cleaned regularly. If there is a lot of sand or precipitation in the operation region, the surface of the solar panel has heavier attachments, and it may need to be cleaned one to two times a day. If there is less of sand or precipitation in the operation region, the surface of the solar panel has less attachments, and it can be cleaned every 10 days. The above two methods both perform indiscriminate processing on multiple solar panel arrays, and are relatively inaccurate. There may be a situation where some panels have less attachments on the surface and are cleaned by the cleaning robot. Third method is a separate detection method, which carefully detects a pollution degree of each of the panel array and determines which panel arrays or panels need to be cleaned. This method is more accurate but less efficient.

As shown in FIG. 3, the data processing system 400, preferably a physical server or a cloud server, is connected to the cleaning robot 200 and/or the shuttling robot 300 to realize data exchange between the cleaning robot 200 and/or the shuttling robot 300, is configured to launch commands to the cleaning robot 200 and/or the shuttling robot 300, and is configured to obtain feedback data from the cleaning robot 200 and/or the shuttling robot 300 at the same time, such as real-time position coordinates of the above two robots and image data collected by the two robots in real time. As a result, the data processing system 400 can realize real-time monitoring of a cleaning operation process of the cleaning robot 200, a traveling of the shuttling robot 300, and a shuttling process, control the shuttling robot 300 to move normally in the passage network of the operation region 100, and control the shuttling robot 300 docked with the solar panel array 101 in the cleaning region.

After the data processing system 400 acquires an information (certain panel numbers) of which solar panel array 101 needs to be cleaned, combined with the time allowed for a cleaning operation in the photovoltaic power station, it estimates a number of the shuttling robot 300 and the cleaning robot 200 required for the cleaning operation. The data processing system 400 calls the shuttling robot 300 to send the cleaning robot 200 to a certain panel array that needs cleaning. The cleaning robot 200 performs a comprehensive cleaning operation on the panel array. After the cleaning operation of the panel array is completed, the data processing system 400 calls the shuttling robot 300 to carry the cleaning robot 200 from an upper surface of one panel array that has been cleaned to an upper surface of another panel array that needs to be cleaned, or to the storage place of the cleaning robot.

The cleaning robot 200 is a product independently developed by the present applicant. Please refer to a series of solar panel cleaning robot related patents applied by the present applicant from 2016 to 2018. After the cleaning robot 200 is transported to a solar panel array, the cleaning robot can travel freely on the panel array, travel around every corner of the panel array, and complete the cleaning operation of an entire panel array while traveling, which will not be repeated here.

Figure 5:
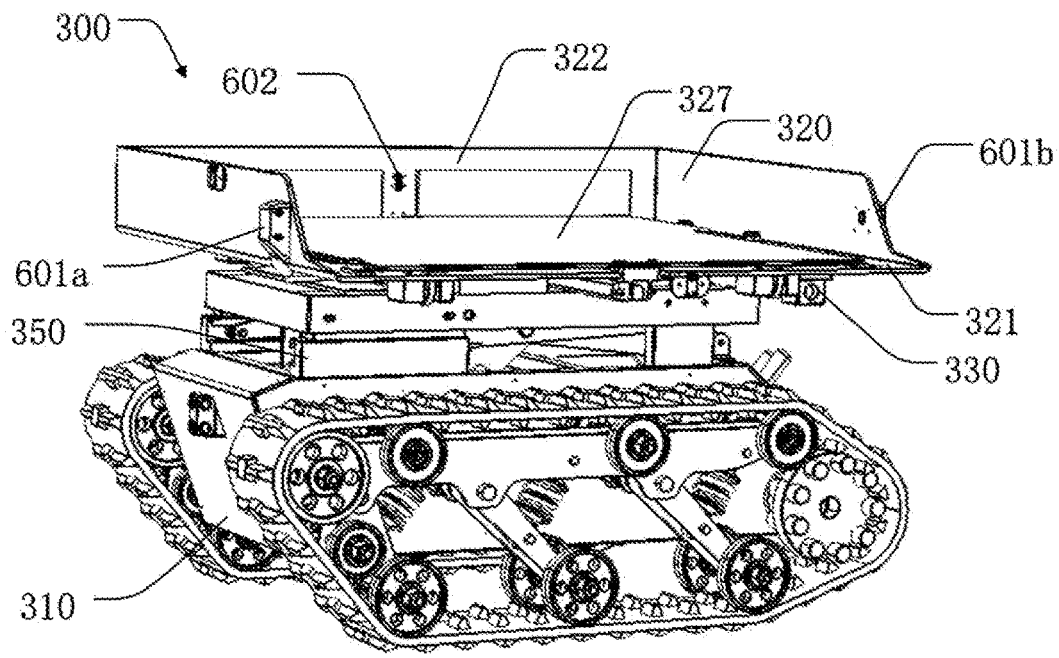
FIG. 5 is a schematic structural diagram of a shuttling robot when a shuttling platform is flat according to an embodiment of the present invention.

As shown in FIG. 5, the present embodiment provides a shuttling robot 300, which includes a vehicle 310, a shuttling device 320, an angle adjustment device 330, and/or a height adjustment device 350.

Figure 6:
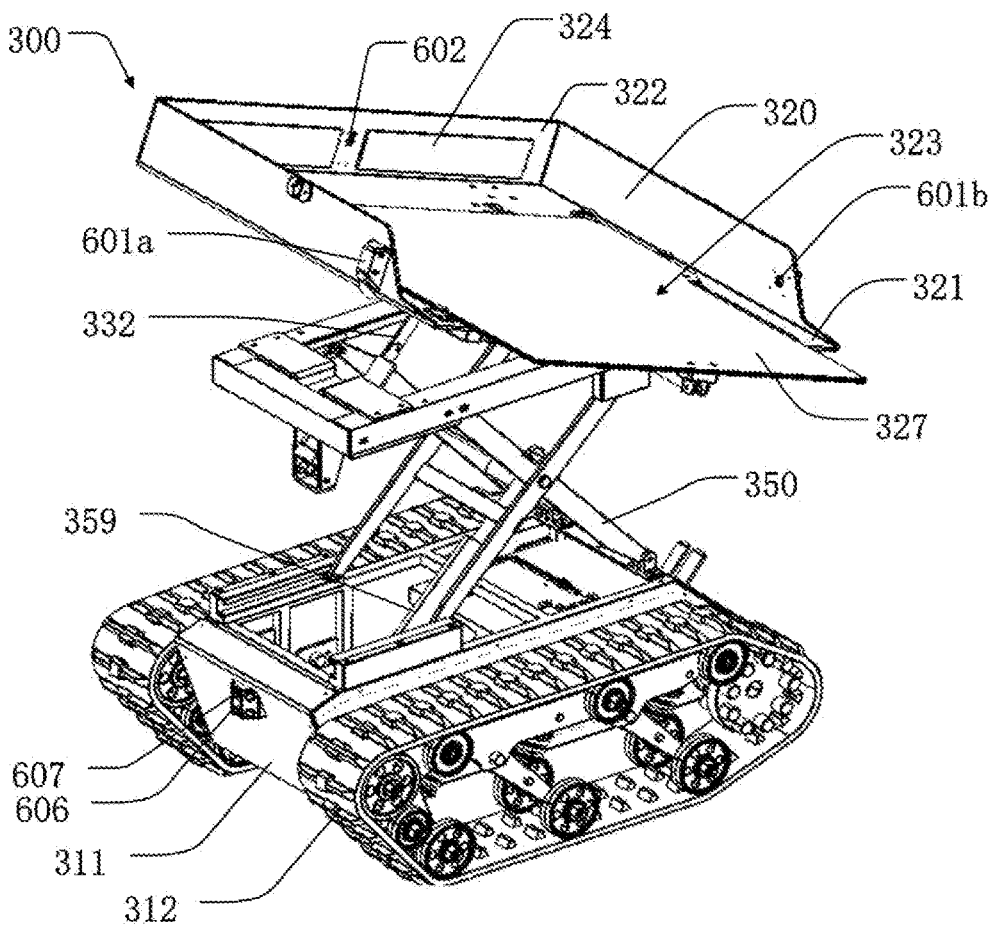
FIG. 6 is a schematic structural diagram of the shuttling robot when the shuttling platform is tilted according to an embodiment of the present invention.
Figure 7:
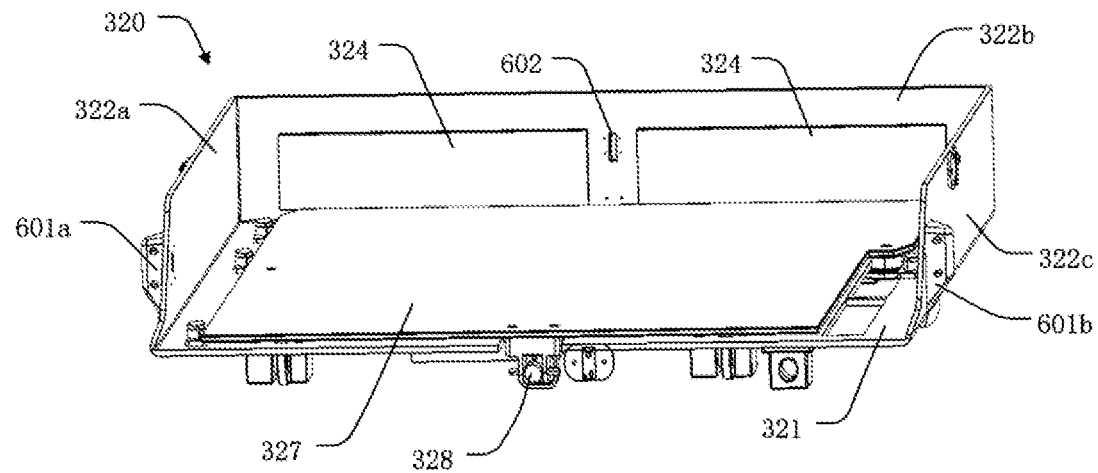
FIG. 7 is a schematic structural diagram of a top of a shuttling device according to an embodiment of the present invention.

As shown in FIG. 5 to FIG. 7, the shuttling device 320 includes a shuttling platform 321 for placing a cleaning robot 200. The shuttling platform 321 is rotatably connected to a top or an upper half of the vehicle 310. In a shuttling process, the cleaning robot 200 travels from an upper surface of the shuttling platform 321 to an upper surface of a panel (on-board process), or from the upper surface of the panel to the upper surface of the shuttling platform 321 (off-board process).

As shown in FIG. 7, the shuttling device 320 includes a baffle 322, which protrudes from an edge of the shuttling platform 321 and is perpendicular to the shuttling platform 321. The baffle 322 includes a left baffle 322a, a rear baffle 322b, and a right baffle 322c that are connected in sequence and are enclosed in a concave shape. An access opening 323 is formed between a free-end of the left baffle 322a and a free-end of the right baffle 322c.

The shuttling device 320 further includes an anti-collision component 324, preferably an anti-collision bar, disposed on an inner sidewall of the rear baffle 322b. Alternatively, an inner sidewall of the left baffle 322a and/or an inner sidewall of the right baffle 322c can also be disposed with the anti-collision bar (not shown).

The shuttling device 320 further includes a bridge board 327 and a first telescopic rod 328. The bridge board 327 is slidably mounted to the upper surface of the shuttling platform 321. An end of the first telescopic rod 328 is connected to a lower surface of the shuttling platform 321, and another end is connected to a lower surface of the bridge board 327. The first telescopic rod 328 is a hydraulic telescopic rod or an electric telescopic rod. The first telescopic rod 328 has a first telescopic rod controller 329. When the first telescopic rod controller 329 receives a command electrical signal, it can control the first telescopic rod 328 to adjust a length of the first telescopic rod. When a length of the first telescopic rod 328 is reduced to the shortest length, the bridge board 327 is positioned on the upper surface of the shuttling platform 321. When the length of the first telescopic rod 328 is extended, the bridge board 327 extends a certain distance in a direction toward the access opening 323. When a distance between the shuttling robot 300 and the solar panel array 101 is the shortest and an angle of the shuttling platform 321 is adjusted to be consistent with the solar panel array 101, the first telescopic rod 328 extends a certain distance, and the bridge board 327 extends toward the solar panel array 101, so that the shuttling platform 321 is connected to the solar panel array 101. Thus, it is convenient for the cleaning robot 200 to smoothly travel from the shuttling platform 321 to the solar panel array 101 (i.e., cleaning region), or from the solar panel array 101 (i.e., cleaning region) to the shuttling platform 321. After a transfer of the cleaning robot 200 is completed, the length of the first telescopic rod 328 is minimized, and the bridge board 327 is retracted to the upper surface of the shuttling platform 321.

As shown in FIG. 6, the vehicle 310 includes a vehicle body 311. Both left and right sides of a bottom of the vehicle body 311 are respectively disposed with traveling devices 312 (such as wheels), preferably crawler wheel sets, which have good adaptability to a road surface and a passable performance is good.

Figure 10:
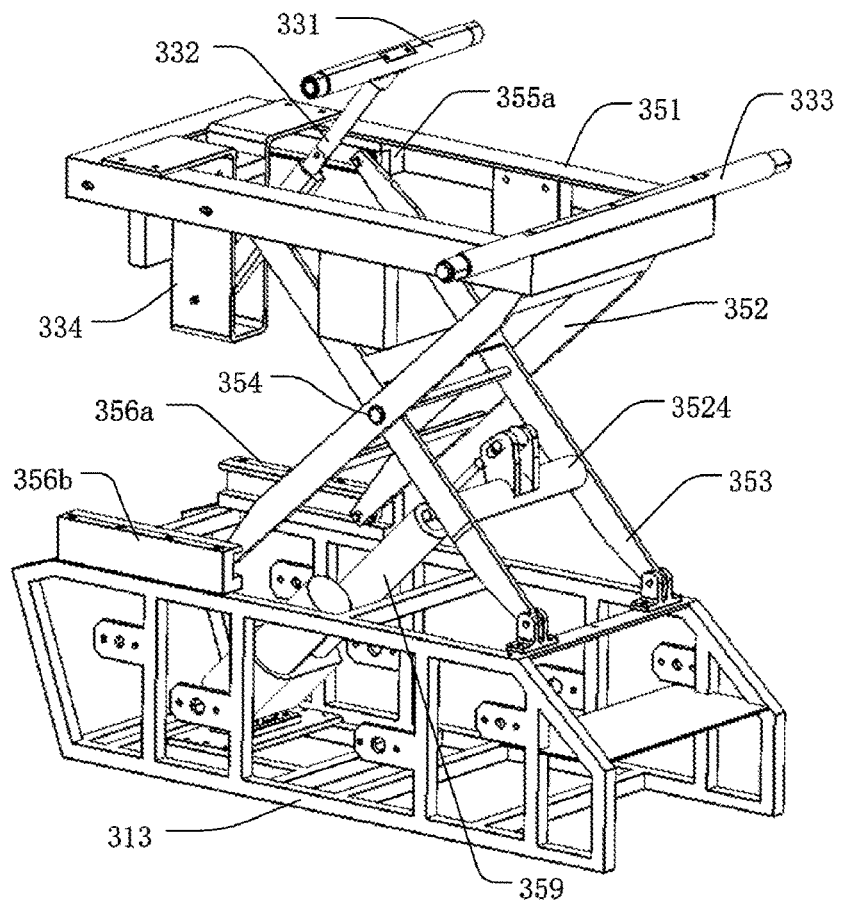
FIG. 10 is a schematic structural view of a height adjustment device in an unfolded state according to an embodiment of the present invention.
Figure 11:
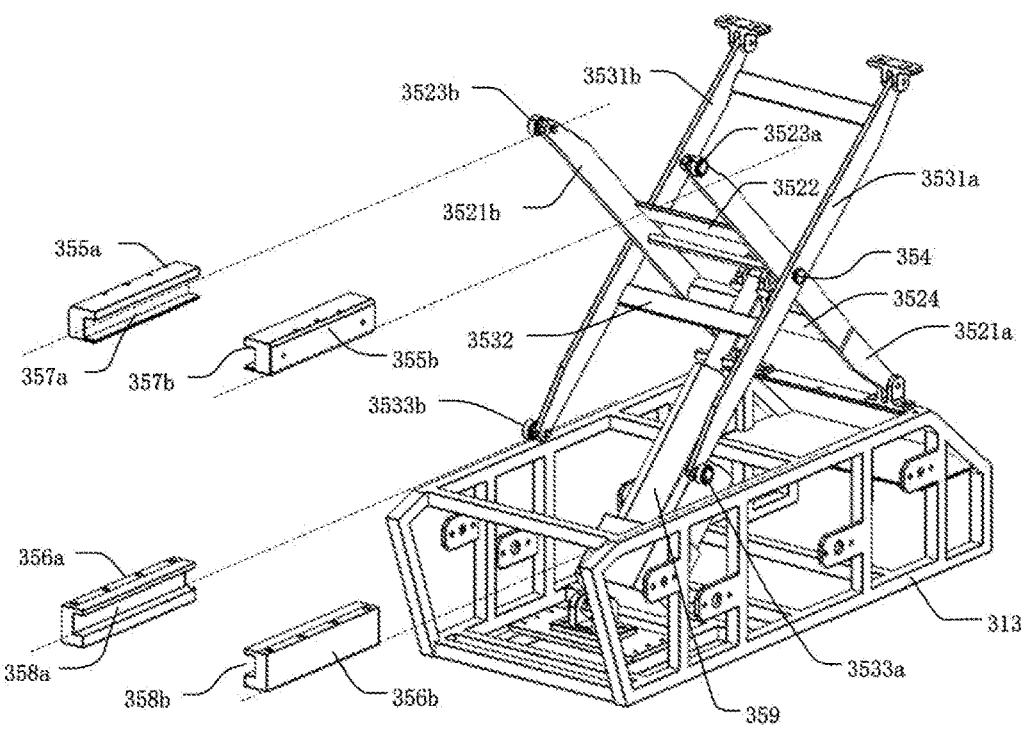
FIG. 11 is a schematic exploded structure diagram of the height adjustment device in the unfolded state according to an embodiment of the present invention.
Figure 12:
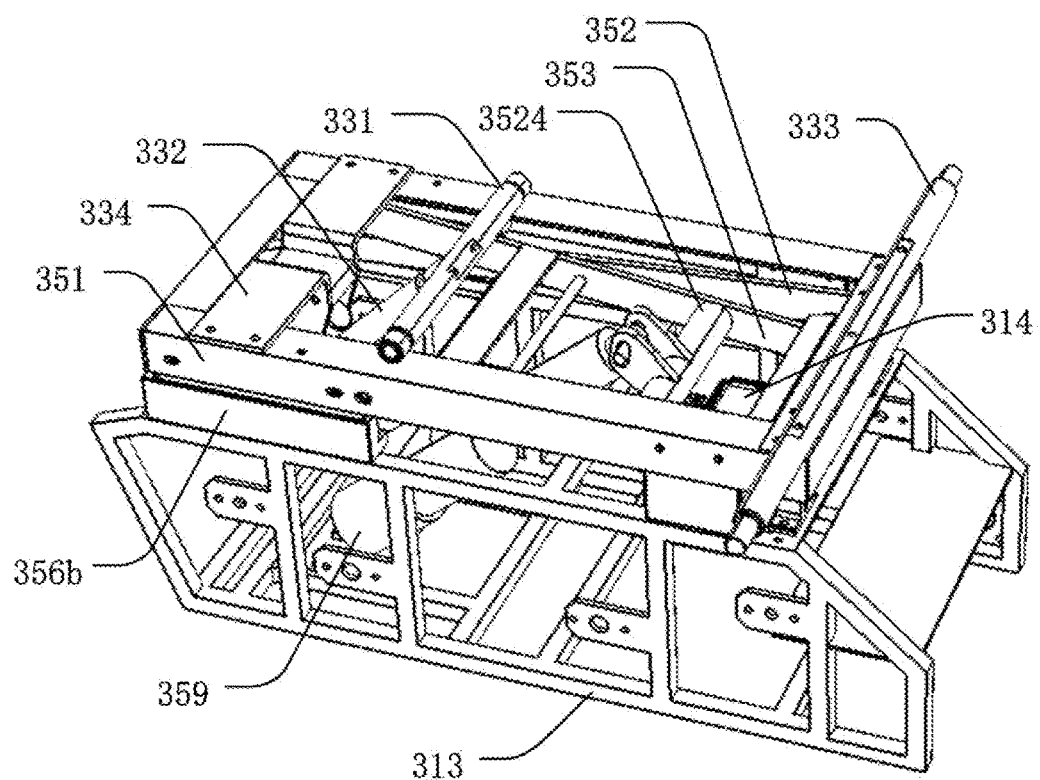
FIG. 12 is a schematic structural view of the height adjustment device in a folded state according to an embodiment of the present invention.

As shown in FIG. 10, the vehicle body 311 includes a vehicle bracket 313. The vehicle bracket 313 is a three-dimensional frame whose overall shape is similar to a rectangular parallelepiped. The vehicle bracket 313 includes a plurality of horizontally disposed transverse-supports and a plurality of vertically disposed longitudinal-supports, and the longitudinal-supports are perpendicular to a horizontal plane or maintain a certain included angle with the horizontal plane. One or more of the baffle is fixed on a top surface, side surfaces, or a bottom surface of the vehicle bracket 313, and the baffles and the vehicle bracket 313 jointly enclose the body 311. As shown in FIG. 5 to FIG. 6 and FIG. 10 to FIG. 12, a height adjustment device 350 is disposed on a top or upper part of the vehicle 310, an angle adjustment device 330 is disposed on a top of the height adjustment device 350, and the shuttling platform 321 is rotatably connected to a top of the angle adjustment device 330, and is configured to control an inclination angle of the shuttling platform 321. As shown in FIGS. 10-12, the angle adjustment device 330 includes a sliding shaft 331, a second telescopic rod 332, a rotating shaft 333, and a telescopic rod mounting frame 334. The second telescopic rod 332 is a hydraulic telescopic rod or an electric telescopic rod. The second telescopic rod 332 has a second telescopic rod controller 335. When the second telescopic rod controller 335 receives a command electrical signal, it can control the second telescopic rod 332 to adjust a length of the second telescopic rod.

Both ends of the sliding shaft 331 are slidably installed in two of first sliding grooves 325c, 325d. The telescopic rod mounting frame 334 is fixed to the height adjustment device 350. An end of the second telescopic rod 332 is rotatably connected to a middle of the sliding shaft 331, another end of the second telescopic rod 332 is rotatably connected to the telescopic rod mounting frame 334, a middle of the rotating shaft 333 is fixedly connected to the height adjustment device 350, and two ends of the rotating shaft are rotatably mounted to two of rotating shaft bases 326a, 326b via base-through-holes 326c, 326d, so that the rotating shaft 333 can rotate relative to the rotating shaft bases 326a, 326b. When a length of the second telescopic rod 332 changes, the inclination angle of the shuttling platform 321 can be adjusted to be larger or smaller.

As shown in FIG. 5 to FIG. 6 and FIG. 10 to FIG. 12, the height adjustment device 350 includes a frame 351, a first bracket 352, a second bracket 353, and a pin shaft 354. The shuttling device 320 is rotatably connected to an end of the frame 351. An upper end of the first bracket 352 is slidably connected to the frame 351, and a lower end of the first bracket is rotatably connected to the top of the vehicle 310. An upper end of the second bracket 353 is rotatably connected to the frame 351, and a lower end the second bracket is slidably connected to the top of the vehicle 310. The pin shaft 354 passes through a middle of the first bracket 352 and a middle of the second bracket 353, and the second bracket 353 is rotatably connected to the first bracket 352 via the pin shaft 354.

The height adjustment device 350 further includes two of first guide rails 355a, 355b disposed oppositely and two of second guide rails 356a, 356b disposed oppositely. The first guide rails 355a, 355b are horizontally mounted on the frame 351. Two opposite surfaces of the two of first guide rails are respectively defined with two of second sliding grooves 357a, 357b opposite to each other. The second guide rails 356a, 356b are horizontally installed on the top of the vehicle 310. Two opposite surfaces of the two of second guide rails are respectively defined with two of third sliding grooves 358a, 358b opposite to each other.

In the angle adjustment device 330, the telescopic rod mounting frame 334 is disposed under the frame 351 and is connected to the frame 351. A middle of the rotating shaft 333 is fixedly connected to an end of a top or an upper half of the frame 351, and two ends of the rotating shaft are rotatably installed to the base-through-holes 326c, 326d of the two of rotating shaft bases 326a, 326b to allow the rotating shaft 333 to rotate relative to the rotating shaft bases 326a, 326b.

In the height adjustment device 350, the first bracket 352 includes two of first link 3521a, 3521b disposed in parallel, and a first cross beam 3522. Two ends of the first cross beam 3522 are respectively connected to the first link 3521a, 3521b. An outer side of an upper end of the first link 3521a or 3521b is disposed with a first pulley 3523a or 3523b, and two of the first pulleys 3523a, 3523b are slidably mounted in the second sliding grooves 357a and 357b, respectively. The second bracket 353 includes two of second links 3531a, 3531b disposed in parallel, and a second cross beam 3532. Two ends of the second cross beam 3532 are respectively connected to the second links 3531a, 3531b. An outer side of a lower end of the second link 3531a or 3531b is disposed with a second pulley 3533a or 3533b, and two of the second pulleys 3533a, 3533b are slidably mounted in the third sliding grooves 358a, 358b, respectively.

The height adjustment device 350 further includes a third telescopic rod 359, an end of which is rotatably connected to the first bracket 352 or the second bracket 353, and another end of which is rotatably connected to the vehicle 310. Preferably, a third cross beam (not shown in the figure) is disposed on the first bracket 352, the two ends of the first bracket are vertically connected to two of the first link 3521a, 3521b, respectively. A sleeve 3524 is sheathed outside the third cross beam. An upper end of the three telescopic rod 359 is hinged to the sleeve 3524 and can rotate around the third cross beam.

The third telescopic rod 359 is a hydraulic telescopic rod or an electric telescopic rod. The third telescopic rod 359 has a second telescopic rod controller 335. When the third telescopic rod controller 360 receives a command electrical signal, it can control the second telescopic rod 332 to adjust a length of the second telescopic rod.

The third telescopic rod 359 is a hydraulic telescopic rod or an electric telescopic rod, which is connected to a processor 340 (refer to FIG. 18), and the processor 340 can send electrical signals to control the first telescopic rod 328, the second telescopic rod 332, and the third telescopic rod to adjust their length, respectively.

As shown in FIG. 3, when the shuttling robot 300 travels to a vicinity of the cleaning region 500 (solar panel or panel array), the data processing system 400 controls the shuttling robot 300 to adjust its position and direction and travels to the first shuttling region 505 at the lower part of the right end of the cleaning region, and to make the access opening 323 of the shuttling device 320 right toward a direction of the cleaning region 500.

In the present embodiment, when the shuttling robot 300 is traveling in the passage region 103, the lengths of the second telescopic rod 332 and the third telescopic rod 359 are minimized, the height of the height adjustment device 350 is minimized, the shuttling platform 321 is disposed horizontally on the top of the vehicle 310, and an included angle between the shuttling platform 321 and the upper surface of the vehicle 310 is zero degree. If the cleaning robot 200 is placed on the shuttling platform 321, it can remain stable during transportation and will not slip off.

As shown in FIG. 3, when the shuttling robot 300 travels to the first shuttling region 505 of the cleaning region 500, the processor 340 sends electrical signals to the second telescopic rod controller 335 and/or the third telescopic rod controller 360 to control the second telescopic rod 332 and/or the third telescopic rod 359 to extend. The third telescopic rod 359 is extended, so that the frame 351 at the upper end of the height adjustment device 350 and the shuttling platform 321 are raised. The second telescopic rod 332 is extended, so that the end of the shuttling platform 321 away from the rotating shaft 333 is propped up, and another end of the shuttling platform rotates around the rotating shaft 333, so that the included angle between the shuttling platform 321 and the upper surface of the vehicle 310 gradually increases until it is consistent with an inclination angle of the cleaning region 500 (solar panel or panel array) relative to the horizontal plane, so that the upper surface of the shuttling platform 321 and the upper surface of the panel in the cleaning region 500 are on a same plane.

Similarly, after the shuttling process is completed, the processor 340 sends electrical signals to the second telescopic rod controller 335 and/or the third telescopic rod controller 360 to control the second telescopic rod 332 and/or the third telescopic rod 359 to be shortened. The second telescopic rod 332 is shortened, so that the included angle between the shuttling platform 321 of the shuttling device 320 and the horizontal plane is reduced to zero degree, and the shuttling platform 321 is restored from an inclined state to a horizontal state. The third telescopic rod 359 is shortened, so that the frame 351 at the upper end of the height adjustment device 350 and the shuttling platform 321 are lowered to the lowest point, and the shuttling robot 300 can then travel to other positions.

During an extension or contraction of the second telescopic rod 332, the two ends of the rotating shaft 333 rotate in the two of the base-through-holes 326c, 326d, and the two ends of the sliding shaft 331 slide in the two first sliding grooves 325c, 325d, so that a bottom of the shuttling platform 321 can keep stable during an inclination angle adjustment process without shaking.

During an extension or contraction of the third telescopic rod 359, the lower end of the first bracket 352 rotates relative to the vehicle, and the first pulleys 3523a, 3523b on the left and right sides of the upper end of the first bracket are slid in the second sliding grooves 357a, 357b, respectively. The upper end of the second bracket 353 rotates relative to the shuttling device 320, and the second pulleys 3533a, 3533b on the left and right sides of the lower end of the second bracket are slid in the third sliding grooves 358a, 358b, respectively. Shape and size of the first bracket 352 and the second bracket 353 are approximately same. The first link 3521b and the second link 3531b have same length. A rotation angle of the lower end of the first bracket 352 is same as a rotation angle of the upper end of the second bracket 353. A sliding distance of the upper end of the first bracket 352 is same as a sliding distance of the lower end of the second bracket 353. During a lifting process of the height adjustment device 350, the shuttling device 320 is always stable and will not shake. If the cleaning robot 200 is loaded on the shuttling platform 321, it can be ensured that the cleaning robot 200 will not slip off the shuttling device 320.

If the inclination angles of all solar panels in the operation region 100 are the same and remain unchanged, an extension distance of the second telescopic rod 332 can be a preset constant length, each time the second telescopic rod 332 is extended, an adjusted inclination angle of the shuttling platform 321 is same as an inclination angle of the panel.

If all the solar panels in the operation region 100 have a same height, the extension distance of the third telescopic rod 332 can also be a preset constant length. The extension distance of the third telescopic rod 359 can be the preset constant length. Each time the third telescopic rod 359 is extended, a rising height of the shuttling platform 321 is same, which is greater than or equal to a height of the lower end of the panel.

If the inclination angles and/or heights of all solar panels in the operation region 100 are different. The data processing system 400 launches commands to the processor 340 of the shuttling robot 300 according to a panel height and a panel inclination angle of the cleaning region 500. The processor 340 launches commands to the third telescopic rod controller 360 to adjust a height of the height adjustment device 350 and a height of the shuttling platform 321. The processor 340 launches commands to the second telescopic rod controller 335 to adjust the inclination angle of the shuttling platform 321.

When the inclination angle of the shuttling platform 321 is adjusted, the data processing system 400 receives a feedback information from the shuttling robot 300 and sends an action command to the cleaning robot 200 to control the cleaning robot 200 traveling from the shuttling platform 321 in the first shuttling region 505 to the solar panel (referred to as upper plate) in the second shuttling region 506, or traveling from the solar panel in the second shuttling region 506 to the shuttling platform 321 (referred to as lower plate) in the first shuttling region 505, so as to complete the shuttling process.

As shown in FIG. 12, the shuttling robot 300 of the present embodiment further includes a circuit board 314, which is preferably disposed in the vehicle 310. The processor 340 is disposed on the circuit board 314 as a control device configured to connect to the shuttling robot 300. The processor 340 is connected to the first telescopic rod controller 329, the second telescopic rod controller 335, and the third telescopic rod controller 360, respectively, and is configured to launch control commands to the first telescopic rod controller 329 and/or the second telescopic rod controller 335, and/or the third telescopic rod controller 360.

Figure 13:
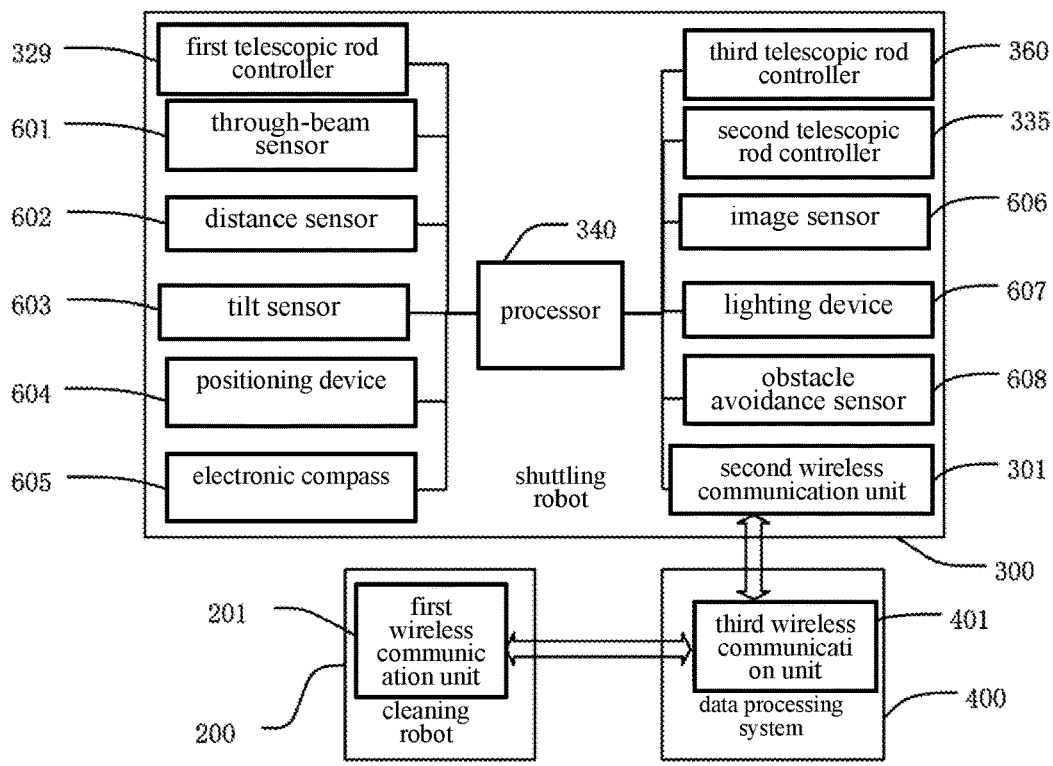
FIG. 13 is a schematic functional block diagram of electronic devices of the cleaning system according to an embodiment of the present invention.

As shown in FIG. 13, the cleaning robot 200 is disposed with a first wireless communication unit 201. The shuttling robot 300 is disposed with a second wireless communication unit 301, and the data processing system 400 is disposed with a third wireless communication unit 401. The first wireless communication unit 201 and the second wireless communication unit 301 are wirelessly connected to the third wireless communication unit 401, respectively, so that the cleaning robot 200 or the shuttling robot 300 can exchange data in a wireless communication manner with the data processing system 400.

As shown in FIG. 4, when the shuttling robot 300 travels to the vicinity of the cleaning region 500 (solar panel or panel array), the data processing system 400 controls the shuttling robot 300 to adjust its position and direction, and travels to the first shuttling region 505 at the lower part of the right end of the cleaning region, and to make the access opening 323 of the shuttling device 320 right toward the direction of the cleaning region 500.

As shown in FIG. 5 to FIG. 6 and FIG. 10 to FIG. 12, in the present embodiment, when the shuttling robot 300 is traveling in the passage region 103, the length of the second telescopic rod 332 is minimized, the shuttling platform 321 is disposed horizontally on the top of the vehicle 310, and the included angle between the shuttling platform 321 and the upper surface of the vehicle 310 is zero degree. If the cleaning robot 200 is placed on the shuttling platform 321, it can remain stable during transportation and will not slip off.

Figure 8:
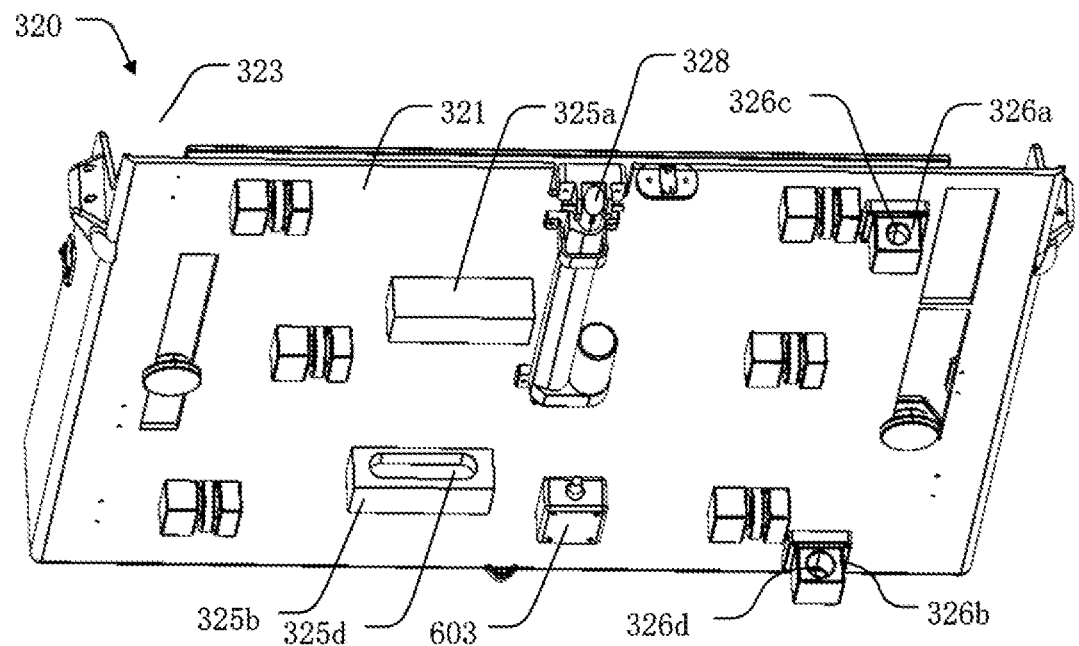
FIG. 8 is a schematic structural view of a bottom of the shuttling device in a direction according to an embodiment of the present invention.
Figure 9:
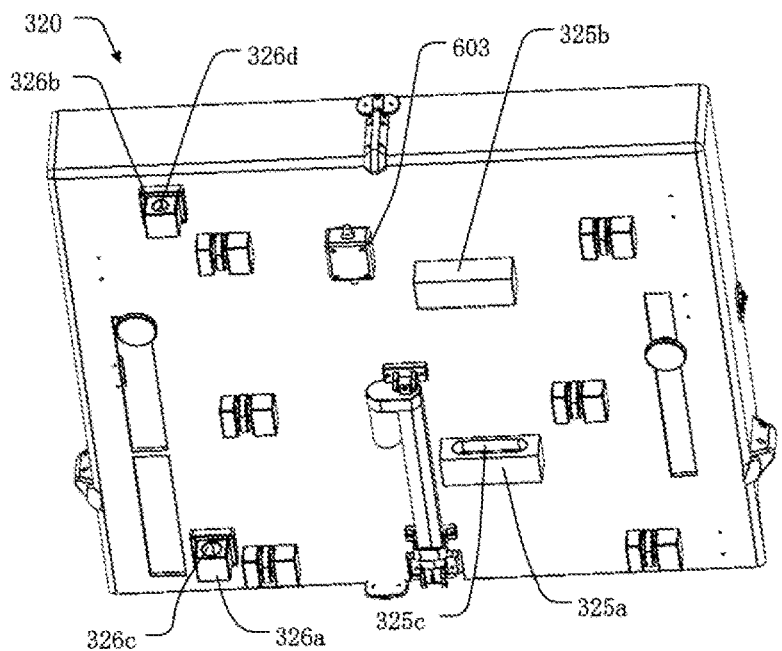
FIG. 9 is a schematic structural view of the bottom of the shuttling device in another direction according to an embodiment of the present invention.

As shown in FIG. 4 to FIG. 6, when the shuttling robot 300 travels to the first shuttling region 505 of the cleaning region 500, the processor 340 sends an electrical signal to the second telescopic rod controller 335 to control the second telescopic rod 332 to extend, the end of the shuttling platform 321 away from the rotating shaft 333 is propped up, and another end of the shuttling platform rotates around the rotating shaft 333, so that the included angle between the shuttling platform 321 and the upper surface of the vehicle 310 gradually increases until it is consistent with an inclination angle of the cleaning region 500 (solar panel or panel array) relative to the horizontal plane, so that the upper surface of the shuttling platform 321 and the upper surface of the panel in the cleaning region 500 are on a same plane. As shown in FIG. 7 to FIG. 9, during an extension of the second telescopic rod 332, the two ends of the rotating shaft 333 rotate in the two of the base-through-holes 326c, 326d, and the two ends of the sliding shaft 331 slide in the two first sliding grooves 325c, 325d, so that a bottom of the shuttling platform 321 can keep stable during an inclination angle adjustment process without shaking.

If the inclination angles of all solar panels in the operation region 100 are the same and remain unchanged, an extension distance of the second telescopic rod 332 can be a preset constant length, each time the second telescopic rod 332 is extended, an adjusted inclination angle of the shuttling platform 321 is same as an inclination angle of the panel.

If the inclination angles of all solar panels in the operation region 100 are different, the data processing system 400 launches commands to the processor 340 of the shuttling robot 300 according to a panel inclination angle of the cleaning region 500. The processor 340 launches commands to the second telescopic rod controller 335 to adjust the inclination angle of the shuttling platform 321.

When the inclination angle of the shuttling platform 321 is adjusted, the data processing system 400 receives a feedback information from the shuttling robot 300 and sends an action command to the cleaning robot 200 to control the cleaning robot 200 traveling from the shuttling platform 321 in the first shuttling region 505 to the solar panel (referred to as upper plate) in the second shuttling region 506, or traveling from the solar panel in the second shuttling region 506 to the shuttling platform 321 (referred to as lower plate) in the first shuttling region 505, so as to complete the shuttling process.

In the present embodiment, when the shuttling platform 321 is in an inclined state, a height of the lowest point of the shuttling platform 321 is greater than or equal to the lowest end of the solar panel or panel array in the operation region 100 (such as the lower end 502 of the cleaning region). A height of the highest point of the shuttling platform 321 is less than or equal to the highest end of the solar panel or panel array in the operation region 100 (such as the upper end 501 of the cleaning region), thereby ensuring that the shuttling platform 321 can be connected to a left side or a right side of the solar panel or panel array (such as the left end 503 or the right end 504 of the cleaning region) to form an all-round butt during the shuttling process.

Regardless of whether the shuttling platform 321 is in an inclined state or a flat state, the height of the lowest point of the shuttling platform 321 is substantially unchanged, and the height basically depends on a height of the top of the vehicle 310. Preferably, a shuttling position between the shuttling platform 321 and the panel is positioned at a lower part of the right side of the panel or panel array, wherein a height requirement for the vehicle 310 is relatively low. The lower a center of gravity of the vehicle 310 is, the more stable the shuttling robot 300 will be during a traveling process of carrying the cleaning robot, effectively preventing from bumps and shaking caused by uneven road surfaces.

As shown in FIG. 13, in the present embodiment, the shuttling robot 300 is further disposed with various data collection devices configured to collect various work data during a working process of the shuttling robot 300. The data collection devices include different types of sensors, including through-beam sensor 601, distance sensor 602, tilt sensor 603, positioning device 604, electronic compass 605, image sensor 606, lighting device 607, and obstacle avoidance sensor 608, and so on. Each of the above-mentioned sensors is wired or wirelessly connected to the processor 340. Original work data collected during an operation of the shuttling robot 300 is sent to the processor 340, and processed by the processor 340 to form preprocessed data. The original work data and/or the preprocessed data is sent to the data processing system 400 through the wireless communication unit to realize real-time monitoring of the shuttling robot 300 operation process and real-time control of the traveling process and/or the shuttling process of the shuttling robot 300.

As shown in FIG. 5 to FIG. 7, the through-beam sensor 601 includes a transmitter 601a and a receiver 601b disposed oppositely, which are respectively disposed on the inner sidewalls of the left baffle 322a and the right baffle 322c of the shuttling device 320. The transmitter 601a and the receiver 601b are close to the access opening 323, and are respectively disposed on both sides of the access opening 323. The through-beam sensor 601 is preferably a pair of through-beam infrared sensors. The infrared rays emitted by the transmitter 601a are captured by the receiver 601b. When the infrared rays are shielded, the processor 340 can determine that an item passes through the access opening 323.

When the cleaning robot 200 travels from an outside to the access opening of the shuttling device 320, the infrared rays between the transmitter 601a and the receiver 601b are shielded, and the through-beam sensor 601 can sense that a front end of the cleaning robot 200 is traveling to the shuttling device 320. When a whole of the cleaning robot 200 is traveled completely inside the shuttling device 320, the infrared rays between the transmitter 601a and the receiver 601b return to the unobstructed state, and the through-beam sensor 601 can sense that a back end of the cleaning robot 200 is also traveled to the shuttling device 320. Based on the real-time electrical signal of the through-beam sensor 601, the processor 340 can determine that the front end of the cleaning robot 200 is traveling to the shuttling device 320, or that the whole of the cleaning robot 200 is traveling completely into the shuttling device 320.

The distance sensor 602 is disposed on an inner sidewall of a middle of the rear baffle 322b of the shuttling device 320, and is disposed opposite to the access opening 323. The distance sensor 602 is preferably a reflective infrared sensor. The reflective infrared sensor continuously emits infrared rays toward the access opening 323. If a reflected infrared rays can be received, it can be determined that the cleaning robot 200 enters the shuttling platform 321 from the access opening 323. Furthermore, a distance between the front end of the cleaning robot 200 and the rear baffle 322b of the shuttling device 320 can be acquired according to a time of a received infrared rays.

When the cleaning robot 200 travels from the outside to the access opening of the shuttling device 320, the distance sensor 602 (reflective infrared sensor) can determine that the cleaning robot 200 is traveling to the shuttling device 320 or not. At the same time, the distance between the front end of the cleaning robot 200 and the rear baffle 322b can be acquired according to the time of the received infrared rays, the processor 340 acquires a value of the distance, and can monitor a progress of the cleaning robot 200 entering the shuttling device 320 in real time, thereby determining whether the whole of the cleaning robot 200 is traveling inside the shuttling platform 321 or not.

When the cleaning robot 200 travels out of the shuttling device 320 through the access opening, the distance sensor 602 (reflective infrared sensor) can determine that the cleaning robot 200 is traveling in and out of the shuttling device 320. At the same time, the distance between the front end of the cleaning robot 200 and the rear baffle 322b can be acquired according to the time of the received infrared rays, the processor 340 acquires the value of the distance, and can monitor a progress of the cleaning robot 200 leaving the shuttling device 320 in real time, thereby determining whether the whole of the cleaning robot 200 is traveling outside the shuttling platform 321 or not.

The tilt sensor 603 is preferably disposed on the lower surface of the shuttling platform 321 (refer to FIG. 8) to measure the included angle between the upper surface of the shuttling platform 321 and the horizontal plane (referred to as a platform tilt angle) in real time, and is configured to send a value of the platform tilt angle to the processor 340. If the inclination angles of all solar panels in the operation region 100 are different or the inclination angles of some panels are variable, each time the second telescopic rod 332 is extended, the tilt sensor 603 monitors the value of the platform tilt angle in real time and sends it to the processor 340. When the value of the platform tilt angle in real time is same as the inclination angle of the panel, the processor 340 sends a stop command to the second telescopic rod controller 335, so that the second telescopic rod 332 stops extending, therefore the platform tilt angle is same as the inclination angle of the panel.

In the present embodiment, the positioning device 604 is a radio frequency identification (RFID) reader, which is disposed inside or outside the vehicle 310, preferably at the bottom of the vehicle 310 or the front end of the shuttling platform 321, is configured to obtain real-time positions in the operation region, and the real-time positions of the vehicle 310 are sent to the processor 340.

In the present embodiment, a label positioning solution is adopted, a recommended route is preset in the passage region 103, the vehicle 310 is controlled to travel along the recommended route, and a set of identifiable tags are set at regular intervals on the recommended route, such as RFID tags. Each of the identifiable tag stores location coordinates of the tag in the operation region and other data. When the shuttling robot 300 travels to a certain positioning point, the RFID reader reads the preset RFID tag at the positioning point, the processor 340 acquires the real-time position of the shuttling robot 300, and optionally sends it to the data processing system 400. In other embodiments, the positioning device 604 can also be a high-precision global positioning system (GPS) positioning unit or a BEIDOU positioning unit, and can also obtain the real-time position of the shuttling robot 300.

The electronic compass 605 is preferably disposed inside or outside the vehicle 310 to obtain a real-time travel direction of the shuttling robot 300 and send it to the processor 340 for data processing and data analysis to determine whether the real-time travel direction of the shuttling robot 300 is consistent with a preset direction or not. If the shuttling robot 300 deviates from the preset direction, the processor 340 sends a command to the vehicle 310 to adjust the travel direction of the vehicle 310 in time.

Preferably, the image sensor 606 and/or the lighting device 607 are disposed at a front and/or rear of the vehicle 310, and the image sensor 606 is configured to collect real-time images and/or pictures of the front and/or rear of the vehicle 310 in real time, and send it to the processor 340. When the shuttling robot 300 travels in the passage region 103 of the operation region 100, an image content collected by the image sensor 606 includes an accessible region in the passage region 103 at any time and is sent to the processor 340. The processor 340 calculates an expected travel region covered by the vehicle 310 in a next period according to a real-time travel speed of the vehicle 310, and compares the expected travel region and a feasible travel region at each moment in real time to determine whether the vehicle 310 is still in the feasible travel region in the next period or not. If the expected travel region exceeds the feasible travel region, it proves that there is an obstacle on a travel route of the vehicle 310. The processor 340 needs to adjust the travel direction of the vehicle 310 in real time to prevent the vehicle 310 from hitting the obstacle during travel.

In other embodiments, the image content collected by the image sensor 606 can further include a border of the solar panel and/or the panel array, and the frame is displayed as a border line in the image. In other embodiments, after processing by a specific algorithm, the shuttling robot 300 can adjust the travel direction in real time with reference to a position of the border line, so that the shuttling robot 300 can travel in a straight line as much as possible.

When the shuttling robot 300 is traveling in a dark environment (such as night, cloudy, etc.), the lighting device 607 is configured to illuminate the passage region in front and/or behind the vehicle 310 for the image sensor 606 to collect the images and/or pictures normally. In some other embodiments, the image sensor 606 and/or the lighting device 607 can also be disposed on the left and/or right side of the vehicle 310 for real-time collection of real-time images and/or pictures on the left and/or right side of the vehicle 310. In some other embodiments, the image sensor 606 and/or the lighting device 607 can also be disposed on the side of the shuttling device 320, and a camera of the image sensor 606 towards the outside. When the height and the inclination angle of the shuttling platform 321 are adjusted to be consistent with the solar panel 102, the camera is right facing the solar panel 102.

The obstacle avoidance sensor 608, preferably an ultrasonic sensor, is disposed at the front and/or rear of the vehicle 310. During the traveling process of the shuttling robot 300, when the processor 340 acquires a sensing signal send from the obstacle avoidance sensor 608 at the front or rear, it can determine that there is an obstacle in the front or rear of the vehicle in a travel route that affect the driving, so that the processor 340 can adjust the travel direction of the shuttling robot 300 to avoid the obstacle. In other embodiments, the obstacle avoidance sensor 608 can also be disposed on the left and/or right side of the vehicle 310.

The present invention provides a cleaning system for cleaning solar panels. According to a workload of a cleaning operation, a suitable number of cleaning robots and shuttling robots are dispatched, and the cleaning robots are configured to complete the cleaning work on the solar panels or solar panel arrays. The shuttling robots are configured to transfer the cleaning robots between multiple solar panel arrays, which can complete the cleaning tasks of all solar panels and panel arrays in the shortest time.

Figure 14:
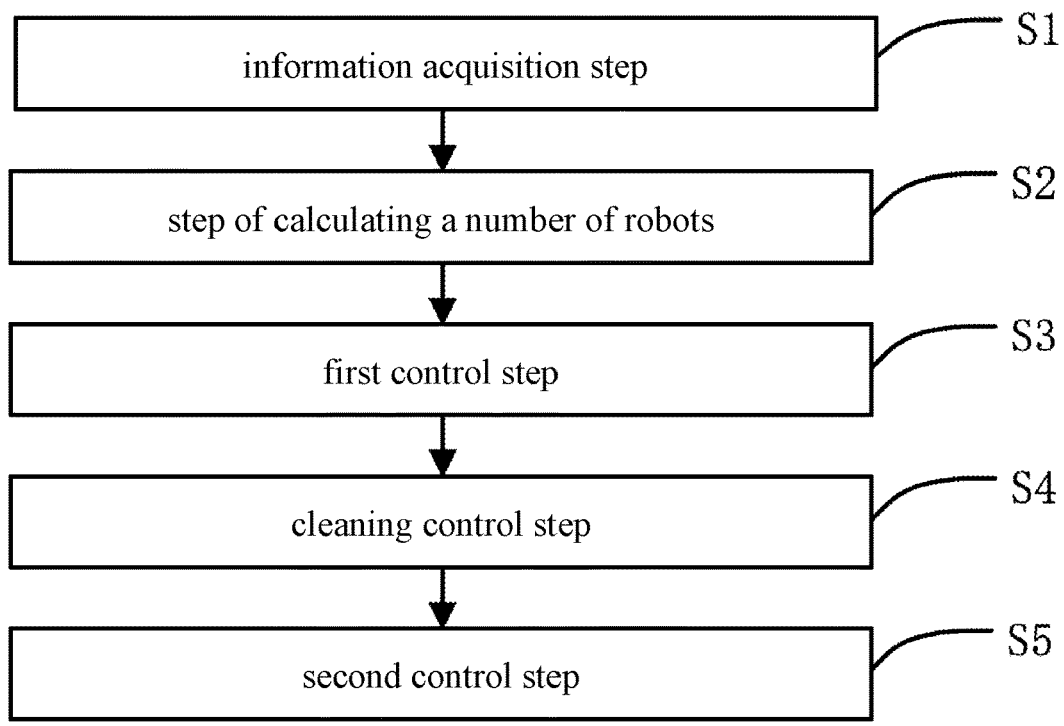
FIG. 14 is a flowchart of a control method of a cleaning system according to an embodiment of the present invention.

As shown in FIG. 14, based on the aforementioned solar panel cleaning system, the present invention also provides a control method of a solar panel cleaning system, which is implemented by software in the data processing system. The data processing system 400 controls the cleaning robot 200 to complete the cleaning work on the solar panel array, and controls the shuttling robot 300 to transfer the cleaning robot between multiple solar panel arrays. The control method of the solar panel cleaning system includes following steps S1 to S5.

An information acquisition step S1, the data processing system acquires an operation region information and an operation task information. The operation region information includes a map of an operation region, the operation region includes all of the cleaning regions and a passage region between two or more of the cleaning regions. At least one positioning point is set in the passage region, at least one identifiable label is set at each of the positioning point, and each of the positioning point is set with at least one identifiable label storing a position and a serial number of the positioning point. The operation region information further includes a serial number, a size, and a position of each of the cleaning region in the operation region, and the position and the serial number of the at least one positioning point in the operation region. The operation task information includes the serial number of the cleaning region that needs to be cleaned and an operation time range allowed to perform the cleaning operation.

Figure 15:
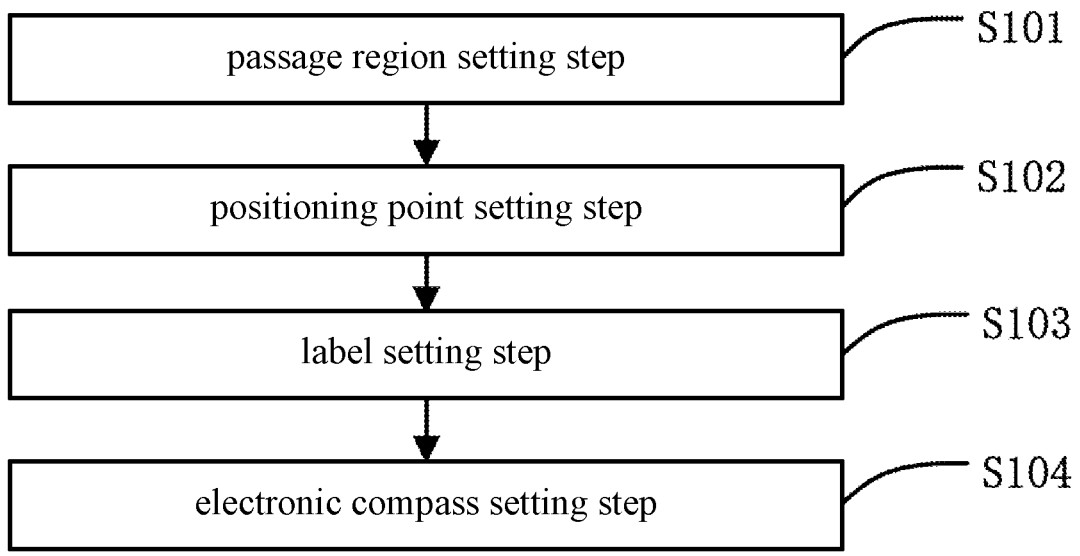
FIG. 15 is a flowchart of a preparation step according to an embodiment of the present invention.

As shown in FIG. 15, the control method of the cleaning system further includes a preparation step, which specifically includes: a passage region setting step S101, setting up two or more of the passage regions to form a passage network for at least one of the robots to travel. A positioning point setting step S102, setting at least one of positioning points in the passage network uniformly. A label setting step S103, setting at least one identifiable label at each of the positioning points, wherein the identifiable label stores an information of the positioning point including a position and a serial number of the positioning point of the identifiable label. And an electronic compass setting step S104, setting an electronic compass in each of the shuttling robot to obtain a real-time travel direction of the shuttling robot. It has been explained above, and will not repeat it here.

Figure 16:
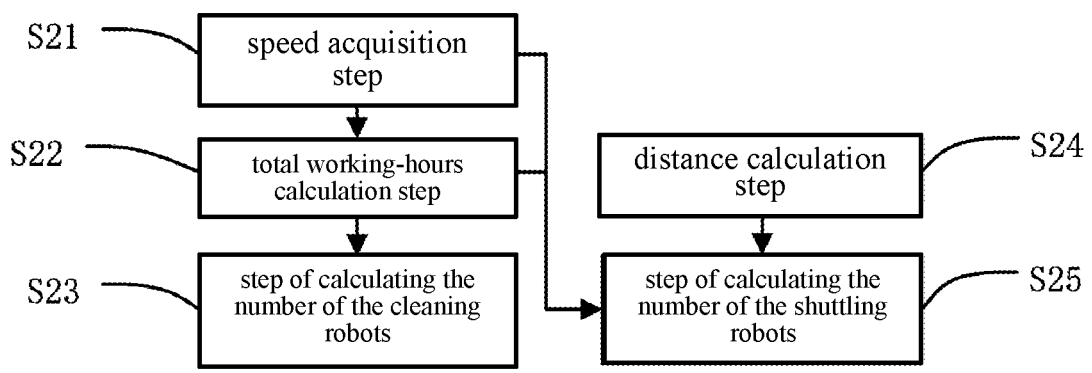
FIG. 16 is a flowchart of a step of calculating a number of robots according to an embodiment of the present invention.

A step of calculating a number of robots S2, the data processing system calculates a number of the cleaning robots and a number of the shuttling robots that need to be dispatched. As shown in FIG. 16, the step of calculating the number of the robots specifically includes following steps. A speed acquisition step S21, acquiring a traveling speed of the cleaning robot and a traveling speed of the shuttling robot. A total working-hours calculation step S22, calculating a working-hours required to complete a cleaning task in each of the cleaning region according to the size of the cleaning region need to be cleaned and the traveling speed of the cleaning robot. A step of calculating the number of the cleaning robots S23, calculating the number M of the cleaning robots that need to be dispatched according to a total number of the cleaning regions that need to be cleaned, the working-hours required to complete the cleaning task in each of the cleaning region, and the operation time range. A distance calculation step S24, calculating a total distance that the shuttling robot needs to travel according to the position of the cleaning region that needs to be cleaned. And, a step of calculating the number of the shuttling robots S25, calculating the number N of the shuttling robots need to be dispatched according to the total distance and the traveling speed of the shuttling robots.

Figure 17:
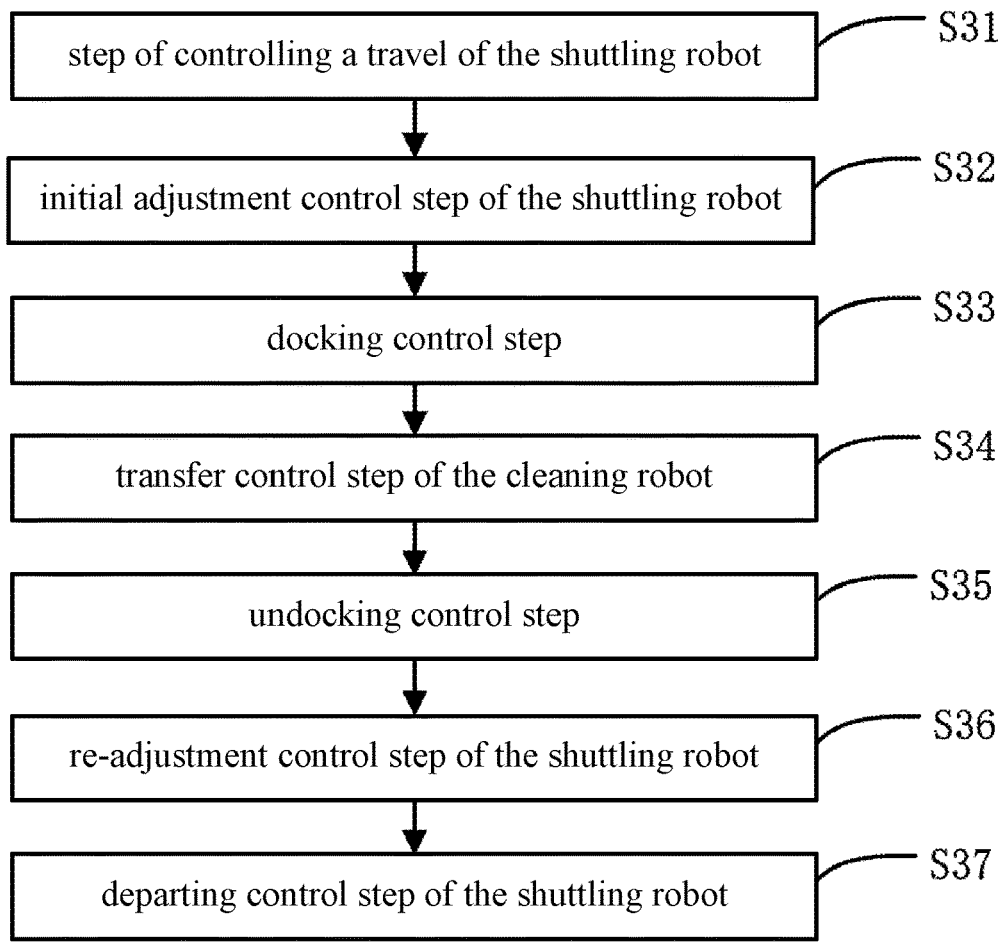
FIG. 17 is a flowchart of a first control step according to an embodiment of the present invention.

As shown in FIG. 17, a first control step S3, the data processing system launches commands to a shuttling robot to control the shuttling robot to carry a cleaning robot to a cleaning region, where the cleaning region a solar panel or a solar panel array. The first control step includes following steps S31 to S37. A step of controlling a travel of the shuttling robot S31, the data processing system controls the shuttling robot loaded with a cleaning robot to travel to a first shuttling region of the cleaning region, where the first shuttling region is a region outside the cleaning region and next to a side of the cleaning region. An initial adjustment control step of the shuttling robot S32, the data processing system controls the shuttling robot to adjust a height and an inclination angle of the shuttling platform and to adjust a position of the shuttling robot. A docking control step S33, after acquiring an in-position signal of the shuttling robot, the data processing system controls the shuttling robot to dock with the cleaning region, and the shuttling robot extends out a bridge board to connect an upper surface of the shuttling platform with an upper surface of the cleaning region. A transfer control step of the cleaning robot S34, after acquiring a docking completion signal, the data processing system controls the cleaning robot to travel to a second shuttling region of the cleaning region, and sending a transfer completion signal, wherein the second shuttling region is a region inside the cleaning region and next to a side of the cleaning region. An undocking control step S35, the data processing system controls the shuttling robot to retract the bridge board so that the upper surface of the shuttling platform leaves from the upper surface of the cleaning region. A re-adjustment control step of the shuttling robot S36, the data processing system controls the shuttling robot to adjust the height and the angle of the shuttling platform, so that the height of the shuttling platform is lower to a lowest point and the shuttling platform remains in a horizontal state. A departing control step of the shuttling robot S37, the data processing system controls the shuttling robot to leave the cleaning region.

In the step of controlling the travel of the shuttling robot S31, the shuttling robot knows a destination position and a passage region map, and the above-mentioned positioning device 604 (tag positioning unit) can be configured to realize automatic navigation. Similarly, the high-precision GPS unit can be used to realize the navigation.

Figure 18:
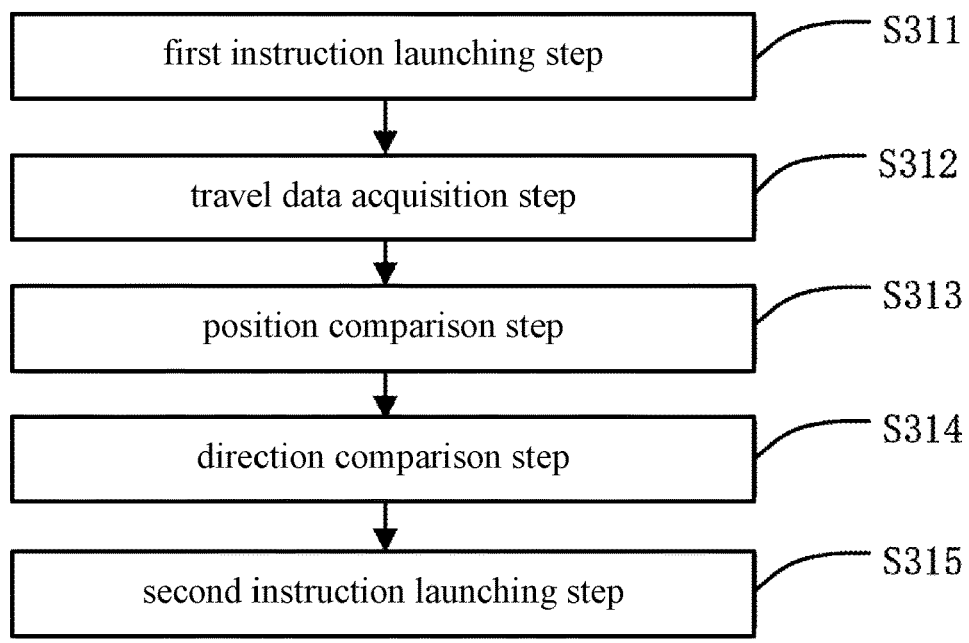
FIG. 18 is a flowchart of a step of controlling a travel of the shuttling robot according to an embodiment of the present invention.

As shown in FIG. 18, the step of controlling the travel of the shuttling robot S31 includes following steps S311 to S315. A first instruction launching step S311, launching a first command to at least one of the shuttling robots, wherein the first command includes the serial number of the shuttling robot and a recommended route of the shuttling robot, and further includes an information of the at least one positioning point positioned on the recommended route and a preset travel direction corresponding to each of the positioning point. A travel data acquisition step S312, when the shuttling robot travels to any of the positioning point, acquiring the information of the positioning point and a real-time travel direction of the shuttling robot. A position comparison step S313, determining whether the positioning point is in the recommended route or not, if not, returning to the first instruction launching step, if yes, executing a next step. A direction comparison step S314, determining whether an actual travel direction of the shuttling robot at the positioning point is consistent with the preset travel direction corresponding to the positioning point or not, if not, determining that the shuttling robot is in a wrong direction, and executing the next step. A second instruction launching step S315, launching a second command to the shuttling robot going the wrong direction, and adjusting the travel direction of the shuttling robot to the preset travel direction corresponding to the positioning point according to the recommended route.

Figure 19:
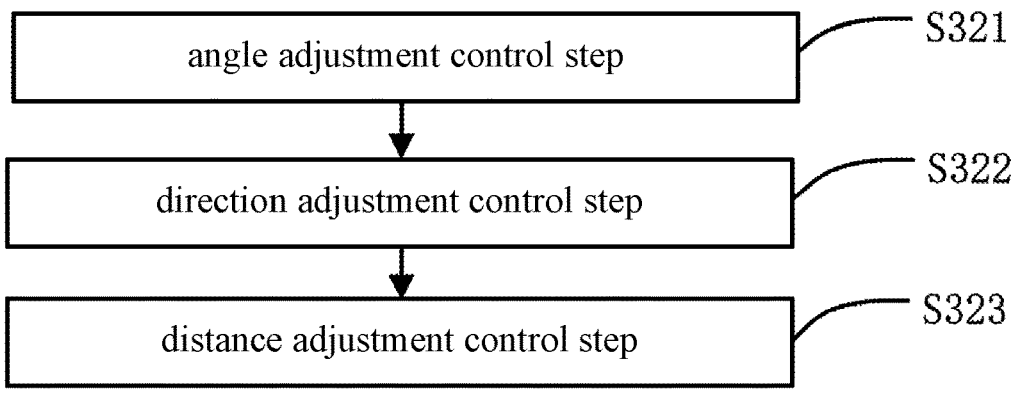
FIG. 19 is a flowchart of a first adjustment control step of the shuttling robot according to an embodiment of the present invention.

As shown in FIG. 19, the initial adjustment control step of the shuttling robot S32 specifically includes following steps S321 to S323. A height and angle adjustment control step S321, the data processing system controls the shuttling robot to adjust the height and an inclination angle of the shuttling platform, so that the upper surface of the shuttling platform and the upper surface of the cleaning region are on a same plane. A direction adjustment control step S322, the data processing system controls the shuttling robot to adjust a direction of an access opening of the shuttling platform so that the access opening of the shuttling platform faces the cleaning region. A distance adjustment control step S323, controlling the shuttling robot to adjust a distance between the shuttling platform and a border of the cleaning region so that the distance between the shuttling platform and the border of the cleaning region being less than a preset threshold. Wherein, when the upper surface of the shuttling platform and the upper surface of the cleaning region are on the same plane, the access opening of the shuttling platform faces the cleaning region, and the distance between the shuttling platform and the border of the cleaning region is less than the preset threshold, the shuttling robot sends a shuttling robot in-position signal. The data processing system controls the shuttling robot to acquire a distance S between the shuttling robot and a border of the cleaning region, and determines whether an actual distance S is greater than a preset distance threshold S0 or not. When the distance S is greater than S0, the data processing system controls the shuttling robot turns to a certain angle A to the right and advances a certain distance B, then turns to a certain angle A to the left and backs a certain distance C, and travels to the first shuttling region, wherein B is (S−S0)/sin A, C is (S−S0)/tg A. When the distance S is less than S0, the shuttling robot turns to the certain angle A to the left and advances the certain distance B, then turns to the certain angle A to the right and backs the certain distance C, and travels to the first shuttling region, wherein B is (S0−S)/sin A, and C is (S0−S)/tg A. After the initial adjustment control step of the shuttling robot S32, the shuttling platform is flush with the upper surface of the panel array, and the distance between the shuttling robot and the cleaning region (solar panel) is also adjusted to an optimal distance (close to the preset distance threshold S0).

In the re-adjustment control step of the shuttling platform S36, the shuttling robot is controlled to lower the height of the shuttling platform to a lowest point and remains in a horizontal state, effectively lowering a center of gravity, and effectively preventing the cleaning robot from slipping or turning over when the shuttling robot is traveling.

A cleaning control step S4, after the cleaning robot travels to the cleaning region, after the data processing system acquires the transfer completion signal sent by the cleaning robot, controlling the cleaning robot to perform cleaning operations on the upper surface of the solar panel according to preset route, and to perform the cleaning operations from up to down in the cleaning region. At the same time, the shuttling robot drives away from the cleaning region and rushes to a storage region or another cleaning region to perform the next task of picking up the cleaning robot. After the cleaning robot completes the cleaning operations, it automatically travels to the second shuttling region 506 at the lower end of the cleaning region (solar panel), waiting to be transported away by another shuttling robot. Since an area size of each of the cleaning region is known, and the driving speed of the cleaning robot is also known, the data processing system can calculate the real-time operation progress of the cleaning robot during the cleaning operations. When an operation progress of the cleaning robot on a solar panel reaches a preset threshold, such as 80%, the cleaning robot can send a reminder signal to the data processing system. The data processing system searches for all idle shuttling robots near the panel in time, and commands the nearest of the shuttling robot goes to the first shuttling region 505 of the panel to pick up the cleaning robot. This solution can reduce a waiting time of cleaning robots and shuttling robots, and improving an overall cleaning efficiency of the power station.

Figure 20:
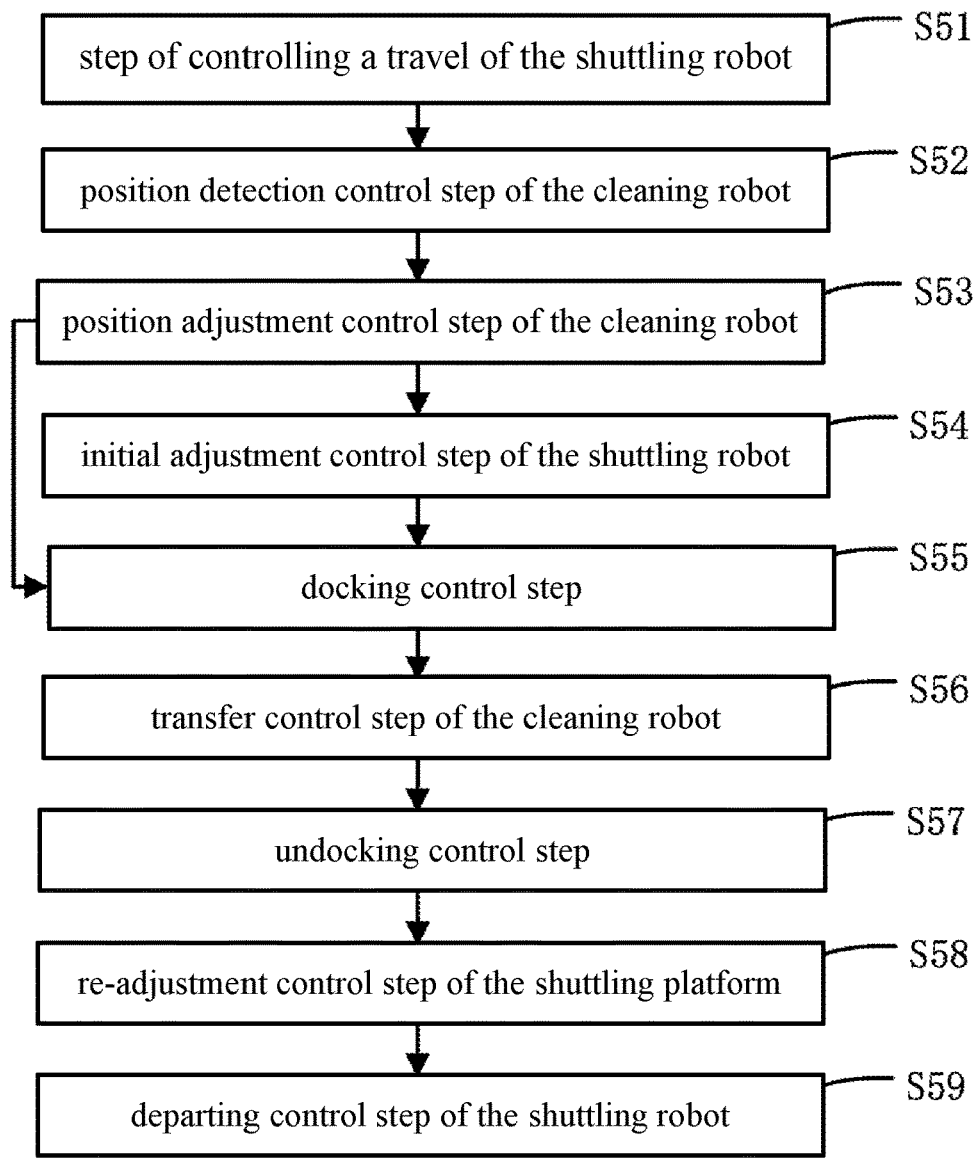
FIG. 20 is a flowchart of a second control step according to an embodiment of the present invention.

A second control step S5, after the cleaning robot completes the cleaning operations, the data processing system controls the shuttling robot to carry the cleaning robot out of the cleaning region. As shown in FIG. 20, the second control step includes following steps S51 to S59. A step of controlling a travel of the shuttling robot S51, the data processing system controls the shuttling robot loaded with a cleaning robot to travel to the first shuttling region of a cleaning region. A position detection control step of the cleaning robot S52, the data processing system controls the shuttling robot to determine whether the cleaning robot is positioned in a second shuttling region or not, if not, executing a next step. A position adjustment control step of the cleaning robot S53, the data processing system controls the cleaning robot to adjust the position to the second shuttling region. An initial adjustment control step of the shuttling robot S54, the data processing system controls the shuttling robot to adjust the height and angle of the shuttling platform. A docking control step S55, after acquiring an in-position signal of the shuttling robot, the data processing system controls the shuttling robot to dock with the cleaning region, and the shuttling robot extends out the bridge board to connect the upper surface of the shuttling platform with the upper surface of the cleaning region. A transfer control step of the cleaning robot S56, after acquiring an in-position signal of the cleaning robot, the data processing system controls the cleaning robot to travel from the second shuttling region of the cleaning region to the shuttling device of the shuttling robot, and sends a transfer completion signal. An undocking control step S57, the data processing system controls the shuttling robot to retract the bridge board so that the upper surface of the shuttling platform leaves from the upper surface of the cleaning region. A re-adjustment control step of the shuttling platform S58, the data processing system controls the shuttling robot to adjust the height and angle of the shuttling platform, so that the height of the shuttling platform is lower to a lowest point and remains in a horizontal state. A departing control step of the shuttling robot S59, the data processing system controls the shuttling robot to leave the cleaning region.

In the step of controlling a travel of the shuttling robot S51, the shuttling robot knows a destination position and a passage region map, and the above-mentioned positioning device 604 (tag positioning unit) can be configured to realize automatic navigation. Similarly, the high-precision GPS unit can be used to realize the navigation. The technical content and technical effect of the step of controlling a travel of the shuttling robot S51 is same as that of the step S31, refer to FIG. 18, and will not be repeated here.

In the present invention, when the cleaning robot travels from the cleaning region to the shuttling robot, if the position of the cleaning robot deviates from the second shuttling region, it may fall from a height during the shuttling process, which poses a certain safety risk. Therefore, in the present embodiment, a position detection control step and a position adjustment control step of the cleaning robot need to be added before docking.

Figure 21:
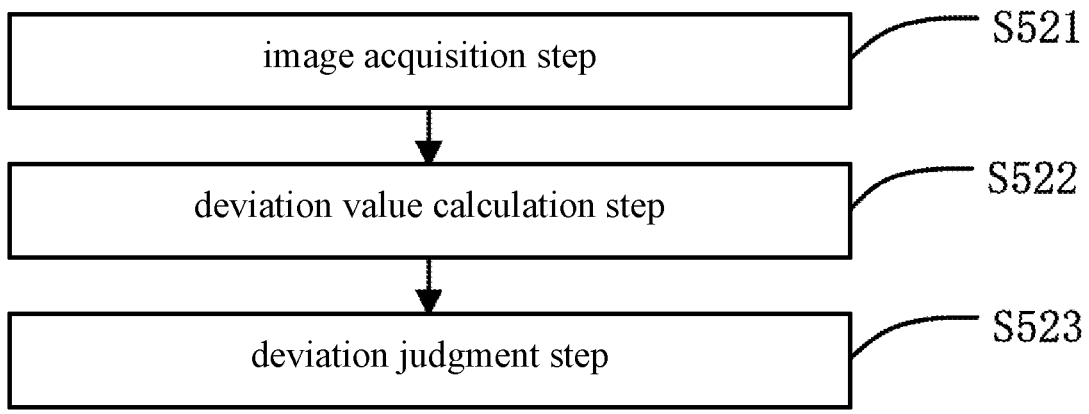
FIG. 21 is a flowchart of a position detection control step of a cleaning robot according to an embodiment of the present invention.

As shown in FIG. 21, the position detection control step of the cleaning robot S52 includes following steps. An image acquisition step S521, a camera on a side of the shuttling robot faced to the solar panel acquiring a real-time picture, which the picture includes an image of the second shuttling region, including a graphic mark on the cleaning robot. A deviation value calculation step S522, calculating a deviation value D between a position of the graphic mark in the real-time picture and a preset position. A deviation judgment step S523, if an absolute value of the deviation value D is less than a preset threshold D0, it is determined that the cleaning robot has reached the second shuttling region. If the absolute value of the deviation value D is greater than or equal to the preset threshold D0, it is determined that the cleaning robot deviates from the second shuttling region. The graphic mark is a mark pre-attached to a front or back of the cleaning robot. The shuttling robot or data processing system is preset with a photo of the cleaning robot before docking, and a position of the mark in the photo is determined. By comparing the position of the mark in an actual photo and the position in the preset photo, it can be determined whether the shuttling robot deviates from the second shuttling region or not.

Figure 22:
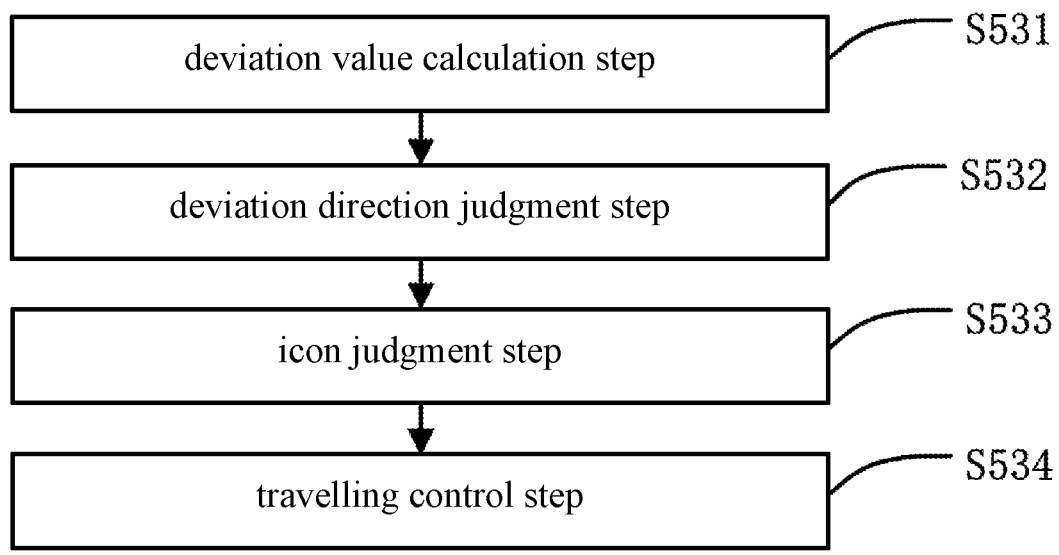
FIG. 22 is a flowchart of a position adjustment control step of the cleaning robot according to an embodiment of the present invention.

As shown in FIG. 22, the position adjustment control step of the cleaning robot S53 includes following steps. A deviation value calculation step S531, calculating the deviation value D between the position of the graphic mark in the real-time picture and the preset position. A deviation direction judgment step S532, judging a deviation direction of the cleaning robot according to the deviation value. An icon judgment step S533, judging whether the graphic mark is positioned on a front surface or a rear surface of the cleaning robot. A travelling control step S534, if the cleaning robot deviates to the left, and the graphic mark is set on the front surface of the cleaning robot, the cleaning robot turns to a certain angle F to the right and backs a certain distance G; then turns to a certain angle F to the left, advances a certain distance H, and travels to the second shuttling region. If the cleaning robot deviates to the left, and the graphic mark is set on the rear surface of the cleaning robot, the cleaning robot turns to the certain angle F to the right and advances the certain distance G; then turns to the certain angle F to the left, backs the certain distance H, and travels to the second shuttling region. If the cleaning robot deviates to the right, and the graphic mark is set on the front surface of the cleaning robot, the cleaning robot turns to the certain angle F to the left and backs the certain distance G; then turns to the certain angle F to the right, advances the certain distance H, and travels to the second shuttling region. If the cleaning robot deviates to the right, and the graphic mark is set on the rear surface of the cleaning robot, the cleaning robot turns to the certain angle F to the left and advances the certain distance G; then turns to the certain angle F to the right, backs the certain distance H, and travels to the second shuttling region. Wherein, G is E/sin F and H is E/tg F. The position detection control step of the cleaning robot S52 and the position adjustment control step of the cleaning robot S53 can ensure that the cleaning robot and the shuttling robot maintain a relative positional relationship, and further ensure the safety of the cleaning robot during the transfer process.

The initial adjustment control step of the shuttling robot S54 has same technical solutions and technical effects as the aforementioned step S32, which can be seen in FIG. 19, which will not be repeated here.

Figure 23:
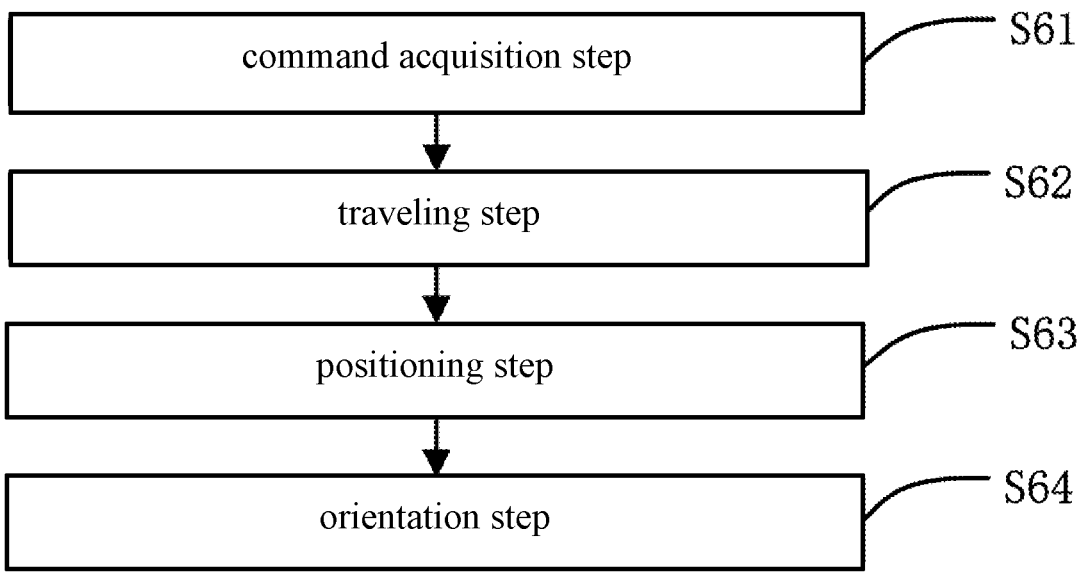
FIG. 23 is a flowchart of a directional positioning step according to an embodiment of the present invention.

In the transfer control step of the cleaning robot S56, the data processing system controls the shuttling robot to reduce the height of the shuttling platform to the lowest point and remains in a horizontal state, effectively lowering a center of gravity, and effectively preventing the cleaning robot from slipping or turning over when the shuttling robot is traveling. As shown in FIG. 23, a shuttling robot performs a directional positioning step during a traveling process, which specifically includes following steps S61 to S64. A command acquisition step S61, acquiring a first command launched by a data processing system, the first command including a destination position of a transport path of the shuttling robot and a recommended route, and further includes a serial number of each of positioning point on the recommended route and a preset travel direction corresponding to each of the positioning point. A traveling step S62, traveling along the recommended route to the destination position according to the first command. A positioning step S63, reading an identifiable tag (such as RFID tag) of any positioning point and acquire a position and the serial number of the positioning point. The shuttling robot sends a feedback signal to the data processing system. The data processing system acquires a real-time position of the shuttling robot according to the feedback signal. An orientation step S64, judging whether an actual travel direction is consistent with the preset travel direction corresponding to the positioning point or not, if not, the actual travel direction is adjusted to the preset travel direction. The steps S61 to S64 are configured to realize a navigation of the shuttling robot, to ensure that the shuttling robot travels to a first shuttling region accurately, and to prevent deviation from the preset route.

Figure 24:
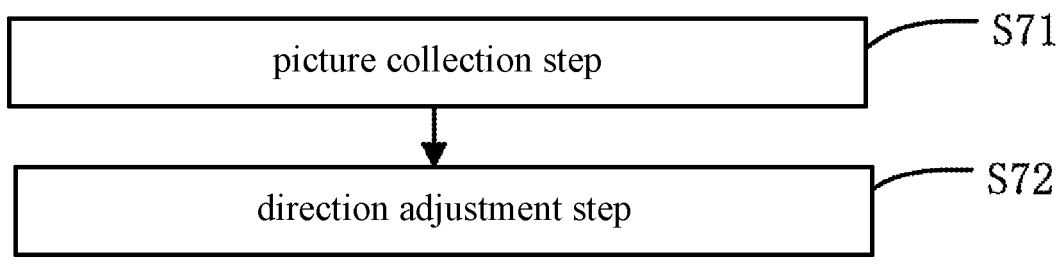
FIG. 24 is a flowchart of a step of fine direction adjustment according to an embodiment of the present invention.

As shown in FIG. 24, the shuttling robot further includes a fine direction adjustment step during the traveling process, which specifically includes following steps S71 to S72. A picture collection step S71, which the shuttling robot uses a camera to collect real-time pictures while traveling. A direction adjustment step S72, which the shuttling robot or the data processing system judges a feasible path and/or a location of obstacles according to real-time pictures, and adjusts a travel direction of the shuttling robot accordingly. The steps S71 to S72 are configured to realize an obstacle avoidance effect during the traveling process of the shuttling robot and prevent a robot from being damaged during traveling.

The present invention provides a control method of a cleaning system to complete an intelligent cleaning of a large number of solar panels. According to a workload of a cleaning operation, a suitable number of cleaning robots and shuttling robots are dispatched, and the cleaning robots are configured to complete the cleaning work on the solar panels or solar panel arrays. The shuttling robots are configured to transfer the cleaning robots between multiple solar panel arrays, which can complete the cleaning tasks of all solar panels and panel arrays in the shortest time.

The above are only the preferred embodiments of the present invention. It should be pointed out that for those of ordinary skill in the art, without departing from the principle of the present invention, several improvements and modifications can be made. These improvements and modifications should also be regarded as the protection scope of the present invention.

What is claimed is:

1. A control method of a cleaning system, comprising following steps:

an information acquisition step of acquiring an operation region information and an operation task information;

a step of calculating a number of robots, calculating a number of the cleaning robots and a number of the shuttling robots that need to be dispatched;

a first control step of controlling a shuttling robot to carry a cleaning robot to a cleaning region;

a cleaning control step of controlling the cleaning robot to perform a cleaning operation on an upper surface of the cleaning region; and a second control step of controlling the shuttling robot to carry the cleaning robot out of the cleaning region, wherein the operation region information comprises a map of an operation region, the operation region comprises all of the cleaning regions and a passage region between two or more of the cleaning regions, at least one positioning point is set in the passage region, at least one identifiable label is set at each of the positioning point, and the identifiable label stores a position and a serial number of the positioning point;

the operation region information further comprises a serial number, a size, and a position of each of the cleaning regions in the operation region, and the position and the serial number of the at least one positioning point in the operation region; and the operation task information comprises the serial number of the cleaning region that needs to be cleaned and an operation time range allowed to perform the cleaning operation.

2. The control method of the cleaning system of claim 1, wherein the step of calculating the number of the robots comprises:

a speed acquisition step of acquiring a traveling speed of the cleaning robot and a traveling speed of the shuttling robot;

a total working-hours calculation step of calculating working-hours required to complete a cleaning task in each of the cleaning regions according to the size of the cleaning region that needs to be cleaned and the traveling speed of the cleaning robot;

a step of calculating the number of the cleaning robots, calculating the number M of the cleaning robots that need to be dispatched according to a total number of the cleaning regions that need to be cleaned, and the working-hours required to complete the cleaning task in each of the cleaning regions, and the operation time range;

a distance calculation step of calculating a total distance that the shuttling robot needs to travel according to the position of the cleaning region that needs to be cleaned; and a step of calculating the number of the shuttling robots, calculating the number N of the shuttling robots that need to be dispatched according to the total distance and the traveling speed of the shuttling robots.

3. The control method of the cleaning system of claim 1, wherein the first control step or the second control step further comprises:

a step of controlling a travel of the shuttling robot, controlling the shuttling robot to travel to a first shuttling region of the cleaning region, wherein the step of controlling the travel of the shuttling robot comprises:

a first instruction launching step of launching a first command to at least one of the shuttling robots, wherein the first command comprises a serial number of the shuttling robot and a recommended route of the shuttling robot, and further comprises an information of at least one positioning point positioned on the recommended route and a preset travel direction corresponding to each of the positioning point;

a travel data acquisition step of, acquiring the information of the positioning point and a real-time travel direction of the shuttling robot when the shuttling robot travels to any of the positioning point;

a position comparison step of determining whether positioning point is in the recommended route or not; if not, returning to the first instruction launching step; if yes, executing a direction comparison step;

the direction comparison step determining whether an actual travel direction of the shuttling robot at the positioning point is consistent with the preset travel direction corresponding to the positioning point or not; if not, determining that the shuttling robot is in a wrong direction, and executing a second instruction launching step; and the second instruction launching step launching a second command to the shuttling robot going in the wrong direction, and adjusting the travel direction of the shuttling robot to the preset travel direction corresponding to the positioning point according to the recommended route.

4. The control method of the cleaning system of claim 1, further comprising:

a passage region setting step of setting up two or more of the passage regions to form a passage network for at least one of the shuttling robot and the cleaning robot to travel;

a positioning point setting step of setting at least one of positioning points in the passage network uniformly; and a label setting step of setting at least one identifiable label at each of the positioning points, wherein the identifiable label stores an information of the positioning point comprising a position and a serial number of the positioning point of the identifiable label.

5. The control method of the cleaning system of claim 1, further comprising:

an electronic compass setting step of setting an electronic compass in each of the shuttling robot to obtain a real-time travel direction of the shuttling robot.

6. The control method of the cleaning system of claim 1, wherein the first control step comprises:

a travel control step of the shuttling robot, controlling the shuttling robot loaded with the cleaning robot to travel to a first shuttling region of the cleaning region, wherein the first shuttling region is a region outside the cleaning region and next to a side of the cleaning region;

a docking control step of after acquiring an in-position signal of the shuttling robot, controlling the shuttling robot to dock with the cleaning region; and a transfer control step of the cleaning robot, after acquiring a docking completion signal, controlling the cleaning robot to travel to the cleaning region, and sending a transfer completion signal.

7. The control method of the cleaning system of claim 6, wherein after the transfer control step of the cleaning robot, the control method further comprises:

an undocking control step of after acquiring the transfer completion signal, controlling the shuttling robot to undock so that an upper surface of the shuttling platform leaves from the upper surface of the cleaning region;

a re-adjustment control step of the shuttling platform, controlling the shuttling robot to adjust a height and an angle of the shuttling platform, so that the height of the shuttling platform is lowered to a lowest point and the shuttling platform remains in a horizontal state; and a departing control step of the shuttling robot, controlling the shuttling robot to leave the cleaning region.

8. The control method of the cleaning system of claim 7, wherein the docking control step further comprises controlling the shuttling robot to extend a bridge board to connect the upper surface of the shuttling platform with the upper surface of the cleaning region, and when the docking is completed, the shuttling robot sending the docking completion signal to a data processing system; and wherein the undocking control step further comprises controlling the shuttling robot to retract the bridge board so that the upper surface of the shuttling platform separates from the upper surface of the cleaning region, and when the docking is completed, the shuttling robot sending the docking completion signal to the data processing system.

9. The control method of the cleaning system of claim 6, wherein in the cleaning control step, after acquiring the transfer completion signal, the cleaning robot is controlled to perform cleaning operation on an upper surface of a solar panel.

10. The control method of the cleaning system of claim 1, wherein the second control step comprises:

a travel control step of the shuttling robot, controlling an unloaded shuttling robot to travel to a first shuttling region of the cleaning region, wherein the first shuttling region is a region outside the cleaning region and next to a side of the cleaning region;

a docking control step of after acquiring an in-position signal of the shuttling robot, controlling the shuttling robot to dock with the cleaning region; and a transfer control step of the cleaning robot, after acquiring an in-position signal of the cleaning robot, controlling the cleaning robot to travel from the cleaning region to a shuttling platform of the shuttling robot, and sending a transfer completion signal.

11. The control method of the cleaning system of claim 10, wherein before the docking control step, the control method further comprises:

an initial adjustment control step of the shuttling robot, controlling the shuttling robot to adjust a height and an inclination angle of the shuttling platform and to adjust a position of the shuttling robot; and wherein the initial adjustment control step of the shuttling robot further comprises:

an initial adjustment control step of the shuttling platform, controlling the shuttling robot to adjust an angle and a height of the shuttling platform so that an upper surface of the shuttling platform and the upper surface of the cleaning region are positioned on a same plane; and/or, a direction adjustment control step of the shuttling platform, controlling the shuttling robot to adjust a direction of an access opening of the shuttling platform so that the access opening of the shuttling platform faces the cleaning region; and/or, a distance adjustment control step of controlling the shuttling robot to adjust a distance between the shuttling platform and a border of the cleaning region so that the distance between the shuttling platform and the border of the cleaning region is less than a preset threshold;

wherein when the upper surface of the shuttling platform and the upper surface of the cleaning region are on the same plane, the access opening of the shuttling platform faces the cleaning region, and the distance between the shuttling platform and the border of the cleaning region is less than the preset threshold, the shuttling robot sends a shuttling robot in-position signal.

12. The control method of the cleaning system of claim 10, wherein before the docking control step, the second control step further comprises:
   a position detection control step of the cleaning robot, controlling the shuttling robot to determine whether the cleaning robot is positioned in a second shuttling region or not; if yes, the shuttling robot sending the in-position signal of the cleaning robot to a data processing system; if not, executing a next step; and
   a position adjustment control step of the cleaning robot, controlling the cleaning robot to adjust a position to the second shuttling region, and the shuttling robot or the cleaning robot sending the in-position signal of the cleaning robot to the data processing system.

* * * * *